(12) United States Patent
Miller

(10) Patent No.: US 7,526,405 B2
(45) Date of Patent: Apr. 28, 2009

(54) STATISTICAL SIGNATURES USED WITH MULTIVARIATE STATISTICAL ANALYSIS FOR FAULT DETECTION AND ISOLATION AND ABNORMAL CONDITION PREVENTION IN A PROCESS

(75) Inventor: John Philip Miller, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 41 days.

(21) Appl. No.: 11/549,447

(22) Filed: Oct. 13, 2006

(65) Prior Publication Data

US 2007/0088528 A1    Apr. 19, 2007

Related U.S. Application Data

(60) Provisional application No. 60/726,962, filed on Oct. 14, 2005.

(51) Int. Cl.
*G06F 19/00* (2006.01)

(52) U.S. Cl. ............................ 702/179; 702/22; 702/23; 702/183; 702/188; 700/108; 700/110; 700/121; 382/144; 382/145; 382/147

(58) Field of Classification Search ................. 702/108, 702/109, 110, 121, 179, 183, 184, 185, 22, 702/23, 188; 700/18–23, 17, 26–28, 48–53, 700/86–88, 83, 108, 121, 110; 714/37, 38, 714/46, 47, 25; 438/14; 709/220, 221, 222, 709/228, 223; 382/144, 145, 147
See application file for complete search history.

(56) References Cited

U.S. PATENT DOCUMENTS 5,960,214 A    9/1999    Sharpe, Jr. et al.
6,017,143 A    1/2000    Eryurek et al.

(Continued)

FOREIGN PATENT DOCUMENTS

DE    101 14 206 A1    11/2001

OTHER PUBLICATIONS

"Be As Smart As Your Instruments," 1 page.

(Continued)

*Primary Examiner*—Carol S Tsai
(74) *Attorney, Agent, or Firm*—Marshall, Gerstein & Borun LLP

(57) ABSTRACT

A system and method for monitoring a process in a process plant and detecting an abnormal condition includes collecting data representative of the operation of the process, performing a multivariate statistical analysis to represent the operation of the process in a known state based on a set of collected reference data, where the reference data includes a statistical measure of the operation of the process in the known state. The system and method may further include representing the operation of the process in an unknown state based on a set of monitored data, where the monitored data includes a statistical measure of the operation of the process in an unknown state, and using the output of the multivariate statistical analysis as an input, and comparing the process in the unknown state to the multivariate statistical representation of the operation of the process in the known state to determine the operational state of the process.

49 Claims, 18 Drawing Sheets

U.S. PATENT DOCUMENTS

| | | | |
|---|---|---|---|
| 6,397,114 B1 | 5/2002 | Eryurek et al. | |
| 6,816,810 B2* | 11/2004 | Henry et al. | 702/179 |
| 6,947,790 B2* | 9/2005 | Gevins et al. | 600/544 |
| 7,085,610 B2 | 8/2006 | Eryurek et al. | |
| 7,113,838 B2* | 9/2006 | Funk et al. | 700/108 |
| 2002/0042694 A1* | 4/2002 | Henry et al. | 702/188 |
| 2003/0013981 A1* | 1/2003 | Gevins et al. | 600/544 |
| 2005/0171627 A1* | 8/2005 | Funk et al. | 700/121 |
| 2006/0173668 A1* | 8/2006 | Haigh et al. | 703/17 |
| 2006/0212145 A1* | 9/2006 | Singh et al. | 700/83 |
| 2007/0005266 A1* | 1/2007 | Blevins et al. | 702/22 |
| 2007/0043518 A1* | 2/2007 | Nicholson et al. | 702/23 |

OTHER PUBLICATIONS

"The HART Protocol—A Solution Enabling Technology," http://www.hartcomm.org, 5 pages, (Feb. 2004).

"Time to Tap Into HART," http://www.hartcomm.org, 3 pages, (Nov. 2003).

A. Hoskuldsson, "PLS Regression Methods," Journal of Chemometircs, vol. 2: 211-228 (1998).

Abnormal Situation Management Consortium, www.asmconsortium.com.

Adler, http://www.hartcomm.org, "Continuous HART Communication Increases Safety Integrity Level (SIL)," 3 pages, (Dec. 2000).

B.M. Wise, N.B. Gallagher, The Process Chemometrics Approach to Process Monitoring and Fault Detection,: J. Proc. Cont. vol. 6, No. 6: 329-348 (1996).

E. Eryurek, P. Sharpe, D. White, "Abnormal Situation Prevention Through Smart Field Devices," NPRA 2005 Annual Meeting, Mar. 13-15, San Francisco, CA (2005).

E.L. Russell, L.H. Chiang, R.D. Braatz, "Data-Driven Techniques for Fault Detection and Diagnosis in Chemical Processes," 33-80 Springer-Verlag London Limited (2000).

Helson, http://www.hartcomm.org, "HART Communication: Driving New Product Developments," 11 pages, (Mar. 2004).

Helson, http://www.hartcomm.org, "Preventing Process Disruptions-The Solution Could Be In Your Smart Instruments," 4 pages.

Helson, http://www.hartcomm.org, "The Impact of HART on Process Automation," 3 pages, (Jun. 2004).

Helson, http://www.hartcomm.org, "Understanding the Power of HART Communication," 3 pages, (Mar. 2003).

Helson, R., "The Impact of HART on Process Automation, The Compelling Case for the World's Most Used Digital Communication Protocol," www.hartcomm.org, (Jun. 2004).

Internet web page print out of internet access: http://www.hartcomm.org/about/aboutcf.html Pertaining to an overview of the Hart Communication Foundation.

Internet web page print out of internet access: http://www.hartcomm.org/technical/history.html Pertaining to the History of HART Protocol.

Internet web page print out of internet access: http://www.hartcomm.org/technical/benefits.html Pertaining to Benefits of HART Communication.

Internet web page print out of internet access: http://www.hartcomm.org/technical/applications/app_main.html Pertaining to HART-based Applications.

Internet web page print out of internet access: http://www.fieldbus.org/index.php?option=com_content&task=view&id=23&Itemid=308 Pertaining to an Overview of the Fieldbus Foundation.

Internet web page print out of internet access: http://www.fieldbus.org/indes.php?option=com_content&task=view&id=136&Itemid=307 Pertaining to the History of the Fieldbus Foundation.

Internet web page print out of internet access: http://www.fieldbus.org/indes.php?option=com_content&task=view&id=45&Itemid=195 Pertaining to System Technology.

Internet web page print out of internet access: http://www.hartcomm.org/technical/overview.html. Pertaining to an Overview of HART Protocol.

Internet web page printout of internet access: http://www.hartcomm.org/technical/white_papers.html Pertaining to White Papers for HART Communication.

Internet web page printout of internet access: http://www.hartcomm.org/technical/applications/sasol.html "Sasol Wins 2005 HART Plant of the Year Award," (Nov. 1, 2005).

Internet web page printout of internet access: http://www.hartcomm.org/technical/applications/hart_connection/hart_connection_main.html, http://www.hartcomm.org/technical/applications/hart_connection/hart_connection_1.html, http://www.hartcomm.org/technical/applications/hart_connection/hart_connection_2.html, http://www.hartcomm.org/technical/applications/hart_connection/hart_connection_3.html, http://www.hartcomm.org/technical/applications/hart_connection/hart_connection_4.html, http://www.hartcomm.org/technical/applications/hart_connection/hart_connection_5.html "The HART Connection."

Internet web page printout of internet access: http://www.hartcomm.org/technical/applications/enhanced_ddl.html "Enhanced DDL Capabilities Standardize Presentation of Intelligent Device Information-Information for Users and Automation Suppliers."

Internet web page printout of internet access: http://www.hartcomm.org/technical/applications/network/compnet.html "Evaluating Fieldbus Networks-Choose the Right Tool for the Job."

Internet web page printout of internet access: http://www.hartcomm.org/technical/applications/invmgt.html "Inventiry Management Application."

Internet web page printout of internet access: http://www.hartcomm.org/technical/applications/openarch.html "Open Architecture Applications."

Internet web page printout of internet access: http://www.hartcomm.org/technical/applications/remote.html "Remote Operation Application."

Internet web page printout of internet access: http://www.hartcomm.org/technical/applications/featappsep.html "Be As Smart As Your Instruments."

Internet web page printout of internet access: http://www.hartcomm.org/technical/applications/featappjune2.html "Continuous HART Communication Increases Safety Integrity Level (SIL)."

Internet web page printout of internet access: http://www.hartcomm.org/technical/applications/diagnostics.html "HART Communications and Advanced Diagnostics Work Together to Maximize the Productivity of Instrument Technicians."

Internet web page printout of internet access: http://www.hartcomm.org/technical/applications/featappmay.html "Unmanned Offshore Gas Production with HART Networks."

Internet web page printout of internet access: http://www.hartcomm.org/technical/applications/commissioning.html "Commisssioning HART Networks."

Internet web page printout of internet access: http://www.hartcomm.org/technical/applications/multidrp.htm "HART Multidrop Networks."

Internet web page printout of internet access: http://www.hartcomm.org/technical/applications/multiplexer.html "Multiplexers."

Internet web page printout of internet access: http://www.hartcomm.org/technical/applications/nonhart.html "Reading HART Data Into Non-HART Systems."

Internet web page printout of internet access: http://www.hartcomm.org/technical/applications/costsave.html "Cost-Saving Applications."

Internet web page printout of internet access: http://www.hartcomm.org/technical/applications/dupont.html "DuPont Uses HART Data to Satisfy Safety Interlock System Valve Test Requirements."

Internet web page printout of internet access: http://www.hartcomm.org/technical/applications/tenmisconceptions.html "Top 10 Misperceptions About HART Technology (Or What You Thought You Knew But Didn't)."

Internet web page printout of internet access: http://www.hartcomm.org/technical/applications/calibrate.html "Calibrating HART Field Devices."

Internet web page printout of internet access: http://www.hartcomm.org/technical/applications/hart_beats.html "HART Beats Stronger."

L.H. Chiang, E.L. Russell, R.D. Braatz, "Fault Detection and Diagnosis in Industrial Systems," 35-84 Springer-Verlag London Limited, (2001).

L.H. Chiang, E.L. Russell, R.D. Braatz, "Fault Diagnosis in Chemical Processes Using Fisher Discriminant Analysis, Discriminant Partial Least Squares, and Principal Component Analysis," Chemometrics and Intelligent Laboratory Systems 50: 243-252 (2000).

M. Defernez, E.K. Kemsley, "The Use and Misuse of Chemometrics for Treating Classification Problems," Trends in Analytical Chemistry, vol. 16, No. 4: 216-221 (1997).

N. Kaistha, B.R. Upadhyaya, "Incipient Fault Detection and Isolation of Field Devices in Nuclear Power Systems Using Principal Component Analysis," Nuclear Technology, vol. 136: 221-230 (2001).

P. Geladi, B.R. Kowalski, "Partial Least-Squares Regression: A Tutorial," Analytica Chimica Acta, 185: 1-17 (1986).

P.M. Frank, "Fault Diagnosis in Dynamic Systems Using Analytical and Knowledge-Based Redundancy—A Survey and Some New Results," Automatica, 26: 459-474 (1990).

P.R. Goulding, B. Lennox, D.J. Sandoz, K.J. Smith, O. Marjanovic, "Fault Detection in Continuous Processes Using Multivariate Statistical Methods," Control Technology Centre, School of Engineering, University of Manchester, Manchester, UK.

Pratt, http://www.hartcomm.org, "HART Networks," 32 pages, (Apr. 2002).

Pratt, http://www.hartcomm.org, "Sorting Out the Protocols: Network Soup," 17 pages, (Jan. 2002).

R. Isermann, "Fault Diagnosis of Machines via Parameter Estimation and Knowledge Processing—Tutorial paper," Automatica, 29: 815-835 (1993).

R. Szanyi, M. Raterman, E. Eryurek, "Diagnostics Capabilities of FOUNDATION Fieldbus Pressure Transmitters," Hydrocarbon Processing, pp. 53-59 (Apr. 2003).

Rosemont Product Documentation, Model 3051S FOUNDATION Fieldbus Supplement, 00809-0200-4801, Rev, AA, www.rosemount.com.

S. Yoon, J. Landry, N. Kettaneh, W. Pepe, S. Wold, "Multivariate Process Monitoring and Early Fault Detection (MSPC) Using PCA and PLS," Plant Automation and Decision Support Conference, San Antonio, Texas, pp. 21-24 (Sep. 2003).

S. Yoon, J.F. MacGregor, "Fault Diagnosis with Multivariate Statistical Models Part I: Using Steady State Fault Signatures," Journal of Process Control 11: 387-400 (2001).

S.B. Franklin, D.J. Gibson, P.A. Robertson, J.T. Pohlmann, J.S. Fralish, "Parallel Analysis: A Method for Determining Significant Principal Components." Journal of Vegetation Science, 6:99-106 (1995).

S.J. Qin, T.J. McAvoy, "Nonlinear PLS Modeling Using Neural Networks," Computers Chem. Engng, vol. 16, No. 4: 379-391 (1992).

W. Ku, R.H. Storer, C. Georgakis, "Disturbance Detection and Isolation by Dynamic Principal Component Analysis," Chemometrics and Intelligent Laboratory Systems, 30: 179-196 (1995).

Naes et al., "Understanding the Collinearity Problem in Regression and Discriminant Analysis," J. Chemometrics, 15:413-426 (2001). Available On-line at: http://mevik.net/work/publications/understanding_collinearity.pdf.

International Search Report for International Application No. PCT/US2006/039898, dated Mar. 13, 2007.

Written Opinion for International Application No. PCT/US2006/039898, dated Mar. 13, 2007.

* cited by examiner

STATISTICAL SIGNATURES USED WITH MULTIVARIATE STATISTICAL ANALYSIS FOR FAULT DETECTION AND ISOLATION AND ABNORMAL CONDITION PREVENTION IN A PROCESS

RELATED APPLICATIONS

This patent claims priority from U.S. Provisional Application Ser. No. 60/726,962 which was filed on Oct. 14, 2005, the contents of which are expressly incorporated by reference herein in its entirety for all purposes.

TECHNICAL FIELD

This patent relates generally to performing diagnostics and maintenance in a process plant and, more particularly, to providing predictive diagnostics capabilities within a process plant in a manner that reduces or prevents abnormal conditions within the process plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, improperly tuned process control loops, one or more failures in communications between devices within the process plant, etc. These and other problems, while numerous in nature, generally result in the process operating in an abnormal state (i.e., the process plant being in an abnormal condition) which is usually associated with suboptimal performance of the process plant.

Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management which includes numerous control module and control loop diagnostic tools. Likewise, maintenance workstations, which may be connected to the process control devices, such as field devices, via the same communication connections as the controller applications, or via different communication connections, such as object linking and embedding (OLE) for process control (OPC) connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the Asset Management Solutions (AMS) Suite: Intelligent Device Manager application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, a maintenance person may use this information to monitor, maintain, and/or diagnose problems with field devices.

Similarly, many process plants include equipment monitoring and diagnostic applications such as, for example, RBMware provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant, Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal condition already exists within the plant. Unfortunately, an abnormal condition may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal condition generally associated with the sub-optimal operation of the plant.

Additionally, many process plants can experience an abnormal condition that results in significant costs or damage within the plant in a relatively short amount of time. For example, some abnormal conditions can cause significant damage to equipment, the loss of raw materials, or significant unexpected downtime within the process plant if these abnormal conditions exist for even a short amount of time. Thus, merely detecting a problem within the plant after the problem has occurred, no matter how quickly the problem is corrected, may still result in significant loss or damage within the process plant. As a result, it is desirable to try to prevent abnormal conditions from arising in the first place, instead of simply trying to react to and correct problems within the process plant after an abnormal condition arises.

Because of the potential impact of abnormal conditions on the plant environment, those in academia and industry have extensively studied the fields of Fault Detection and isolation (FDI) and abnormal condition prevention. Systems for detecting faults and/or abnormal conditions generally fell into one of two categories: model-driven methods and data-driven methods. Model-driven methods rely on the existence of some analytical or first-principals model of the system. A fault or abnormal condition is detected when the values of one or more process variables differ significantly from the values predicted by the model. However, model-driven methods typically are of limited use, because the accuracy of a model-driven FDI system or abnormal condition prevention system is dependent solely upon the accuracy of the model. For example, while a particular model may prove accurate for a new process plant, the accuracy of the model may decrease as the devices within the process age or wear or as changes occur in the process due to, for example, process optimization. Thus, after a period, a model that is accurate at the time of its creation may be of limited or no utility in detecting and isolating faults. Further, the creation of a new model to correct the condition may be costly and/or time-consuming and may suffer the same decrease in utility after a relatively short period.

Data-driven techniques constitute the other subset of FDI and abnormal condition prevention methods. Data-driven techniques typically do not use an analytic model of the process, but instead apply information gathered about the process from the measured process variables available in a Distributed Control System (DCS). This data, which may constitute process variable data, includes both raw process variable data and statistical signature data (e.g., mean, standard deviation, maximum, minimum, etc.) or other meta-data. Some industrial processes use a number of data-driven techniques, such as principal component analysis (PCA), discriminant analysis, and partial least squares (PLS) for fault detection and isolation or abnormal condition prevention. Process plants employing data-driven FDI and abnormal condition prevention techniques traditionally use raw process variable data to "learn" about the process. However, raw process variable data does not always provide sufficient information to accurately predict and isolate abnormal conditions.

However, it is also known to collect and generate statistical data that enables a user to predict the occurrence of certain abnormal conditions within a process plant before these abnormal conditions actually arise, with the purpose of taking steps to prevent the predicted abnormal condition before any significant loss within the process plant takes place. One method of collecting statistical data is disclosed in U.S. patent application Ser. No. 09/972,078, now U.S. Pat. No. 7,085, 610, entitled "Root Cause Diagnostics" (which is a continuation-in-part of U.S. patent application Ser. No. 09/303,869, which in turn is a divisional of U.S. patent application Ser. No. 08/623,569, now U.S. Pat. No. 6,017,143). The entire disclosures of both of these applications are hereby expressly incorporated by reference herein for all purposes. Generally speaking, this technique places statistical data collection and processing blocks or statistical processing monitoring (SPM) blocks, in each of a number of devices, such as field devices, within a process plant. The statistical data collection and processing blocks collect, for example, raw process variable data and determine certain statistical signatures associated with the collected data, such as a mean, a median, a standard deviation, etc. These statistical signatures may then be sent to a user and analyzed to recognize patterns suggesting the future occurrence of a known abnormal condition. Once a particular suspected future abnormal condition is detected, steps may be taken to correct the underlying problem, thereby avoiding the abnormal condition in the first place.

SUMMARY OF THE DISCLOSURE

A system and method is provided for monitoring a process in a process plant. Specifically, the system and method collects data representative of an operation of the process and uses a multivariate statistical analysis to represent the operation of the process in one or more known states based on the collected data. The collected data includes one or more statistical measures of the operation of the process. Alternatively, a statistical calculation is performed on the collected data to provide one or more statistical measures. The system and method further represents the operation of the process in an unknown state based on monitored data, where the monitored data includes one or more statistical measures of the process in the unknown state. By comparing or representing the process in the unknown state with the multivariate statistical representation of the process in the one or more known states, the condition of the process may be determined. As such, the system may be used to detect or predict abnormal conditions within a process plant by analyzing the statistical measures from the process using a multivariate statistical analysis. In addition, the abnormal condition may be identified based on a likelihood that the monitored data is associated with a known abnormal condition. Using the statistical measures allows for more accurate detection and prediction of abnormal conditions in the process, which in turn may be used for more accurate alarms.

DETAILED DESCRIPTION

Figure 1:
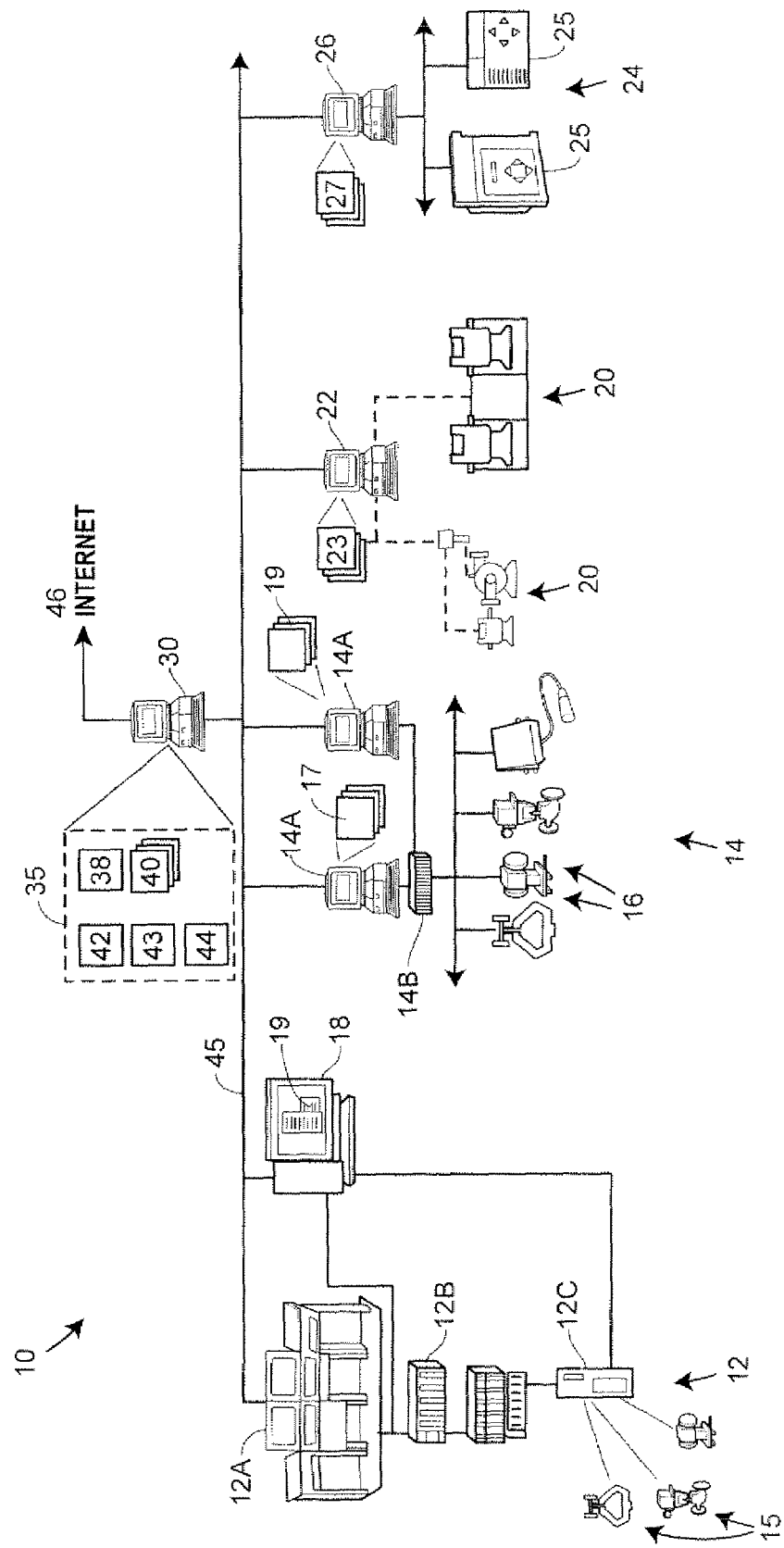
FIG. 1 is an exemplary block diagram of a process plant having a distributed control and maintenance network including one or more operator and maintenance workstations, controllers, field devices and supporting equipment, in which a fault detection and isolation system may be implemented.

Referring now to FIG. 1, an example process plant 10 in which a fault detection and isolation system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART®) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART® or Fieldbus field devices or any other smart or non-smart field devices including, for example, those that use any of the PROFI-BUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications 17 and 19 such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such) as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI (an Emerson Process Management Company) or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues affecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of a fault detection and isolation (FDI) system 35 using a principal component analysis (PCA) on statistical signature data. Statistical signature data may include, but is not limited to, statistical measures such as a mean, a mean change, a median, a median change, a standard deviation, a standard deviation change, a variance, a skewness, a kurtosis, a root-mean-square (RMS), a rate of change, a range, a minimum, a maximum and the like. In particular, the computer system 30 stores and implements a configuration and data collection application 38, one or more viewing or interface applications 40, a PCA module 42 which may include statistical processing blocks and provides multivariate statistical analysis, and a fault detection module 44. The system 30 also stores a statistical process monitoring database 43 that stores statistical signature data generated within certain devices within the process. Generally speaking, the configuration and data collection application 38 configures and communicates with each of a number of statistical data collection and analysis blocks (not shown in FIG. 1) located in the field devices 15, 16, the controllers 12B, 14B, the rotating, equipment 20 or its supporting computer 22, the power generation equipment 25 or its supporting computer 26 and any other desired devices and equipment within the process plant 10, to thereby collect statistical signature data (or in some cases, raw process variable data) from each of these blocks with which to perform fault detection and isolation. The configuration and data collection application 38 may be communicatively connected via a hardwired bus 45 to each of the computers or devices within the plant 10 or, alternatively, may be connected via any other desired communication connection including, for example, wireless connections, dedicated connections which use OPC, intermittent connections, such as ones which rely on handheld devices to collect data, etc. Likewise, the configuration and data collection application 38 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the configuration and data collection application 38 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the configuration and data collection application 38 to computers/devices in the plant 10 are described herein, one of ordinary skill in the art will recognize that a variety of other methods of coupling the configuration and data collection application 38 to computers/devices in the plant 10 can be used as well. The collected data may be reference data, associated with a known normal or known abnormal process condition, or monitored data, for which the process condition is unknown. The configuration and data collection application 38 may generally store the collected data in the database 43.

Although the process plant 10 is shown as including an FDI system 35, it should be understood that the FDI system 35 is not limited to detecting of existing, faults or other abnormal conditions, but may also predict the occurrence of an abnormal conditions examples of which as disclosed further below. As such, the FDI system 35 may be utilized to detect existing faults and other abnormal conditions within the process as part of fault detection and isolation, and to predict the occurrence of faults and other abnormal conditions within the process as part of abnormal condition prevention. For example, the fault detection module 44 may be utilized to detect existing and predicted abnormal conditions, as described herein.

Further, although PCA is primarily disclosed as a multivariate statistical analysis technique that may be employed, it should be understood that PCA is provided only as an example, and PCA is explained in order to better understand the fault detection and abnormal condition prevention methodology employed. As such, other multivariate statistical analysis techniques may also be utilized, including, but not limited to partial least squares (PLS), principal component regression (PCR), discriminant analysis and canonical variate analysis (CVA). Different multivariate statistical analysis techniques may be utilized depending on the abnormal condition being detected. For example, while PCA may be utilized for both detecting and predicting abnormal conditions, PCA may be utilized to detect the occurrence of abnormal conditions whereas PLS and/or PCR may be utilized to predict the occurrence of abnormal conditions. As such, the FDI system 35 may include additional modules for different multivariate analysis techniques and/or the PCA module 42 may be replaced with a PLS module, a PCR module, a discriminant analysis module, a CVA module or any other multivariate statistical analysis module.

Referring again to FIG. 1, once the configuration and data collection application 38 collects the statistical signature (or raw process variable) data, the PCA module 42 may conduct multivariate statistical analysis to process the data in one of several ways. The PCA module 42 may use the collected statistical signature data as reference data associated with a normal condition and one or more abnormal conditions, to determine principal components associated with more than one process condition, and form a loading matrix associated with the combined conditions. Alternatively, the PCA module 42 may use the collected statistical signature data as reference data, associated with a normal or abnormal process condition, to determine principal components associated with the process condition, and form a loading matrix associated with each condition. The PCA nodule 42 may also use raw process variable data, if associated with a known normal or known abnormal process condition, to compute reference statistical signature data from which to determine principal components associated with one or more process conditions. Raw process variable data may include, but is not limited to, data measured from the process including data measured from devices within the process such as temperature, pressure, flow rate, position and the like. The PCA module 42 may further store the results of the principal component analysis, as well as the reference statistical signature data in the database 43 for use by the fault detection module 44 or the viewing application 40. Additionally, the PCA module 42 may determine, using parallel analysis or another similar method, how many principal components calculated by the PCA module 42 to retain for use by the fault detection module 44.

The fault detection module 44 analyzes monitored statistical signature (or raw process variable) data, using the results of the principal component analysis performed by the PCA module 42, to determine the existence or future existence of an abnormal process condition. As described in detail below, the fault detection module 44 may project the monitored statistical signature or raw process variable data into the score matrix, using the loading matrix previously determined by the PCA module 42. The fault detection module 44 may then generate one or more alerts or alarms for operators or maintenance personnel based on the results of the analysis, or otherwise alert process operators or maintenance personnel that an abnormal condition exists or is predicted. Likewise, the fault detection module 44 may store the results of the analysis, including faults detected, alerts or alarms generated, and data projected onto the score matrix (described below), in the database 43 or communicate the results to the viewing and interface application 40.

The viewing and interface application 40 includes an interface for plant personnel such as configuration engineers, process control operators, maintenance personnel, plant managers, supervisors, etc. to view alerts and alarms generated by the fault detection module 44. The viewing application 40 may also include an interface that allows manipulation of various process control parameters, manipulation of the PCA module 42 and the fault detection module 44, and display of relevant data including statistical signature data, raw process variable data, auto-scaled data, data mapped on to score matrices or any other data useful to display for plant personnel.

The viewing and interface application 40 may provide a graphical user interface (GUI) that is integrated with the system 30, or more particularly with the FDI system 35, to facilitate a user's interaction with the monitoring capabilities provided by the FDI system 35. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the FDI system 35.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the FDI system 35 may be represented, accessed, invoked, etc. through one or more corresponding pages, views or displays of the GUT. Furthermore, the various displays making up the GUI may be interlinked in a logical manner to facilitate a user's quick and intuitive navigation through the displays to retrieve a particular type of information or to access and/or invoke a particular capability of the FDI system 35.

Those of ordinary skill in the art will appreciate that the FDI system 35 described herein may operate alone or in cooperation with other systems, including other fault detection and abnormal condition prevention systems. Likewise, the individual applications 38, 40, 42, and 44 described herein as part of the FDI system 35 may operate cooperatively with other applications (not shown) to detect faults, generate alerts and alarms, provide data to plant personnel, allow process or device configuration or any combination of the above.

Figure 2:
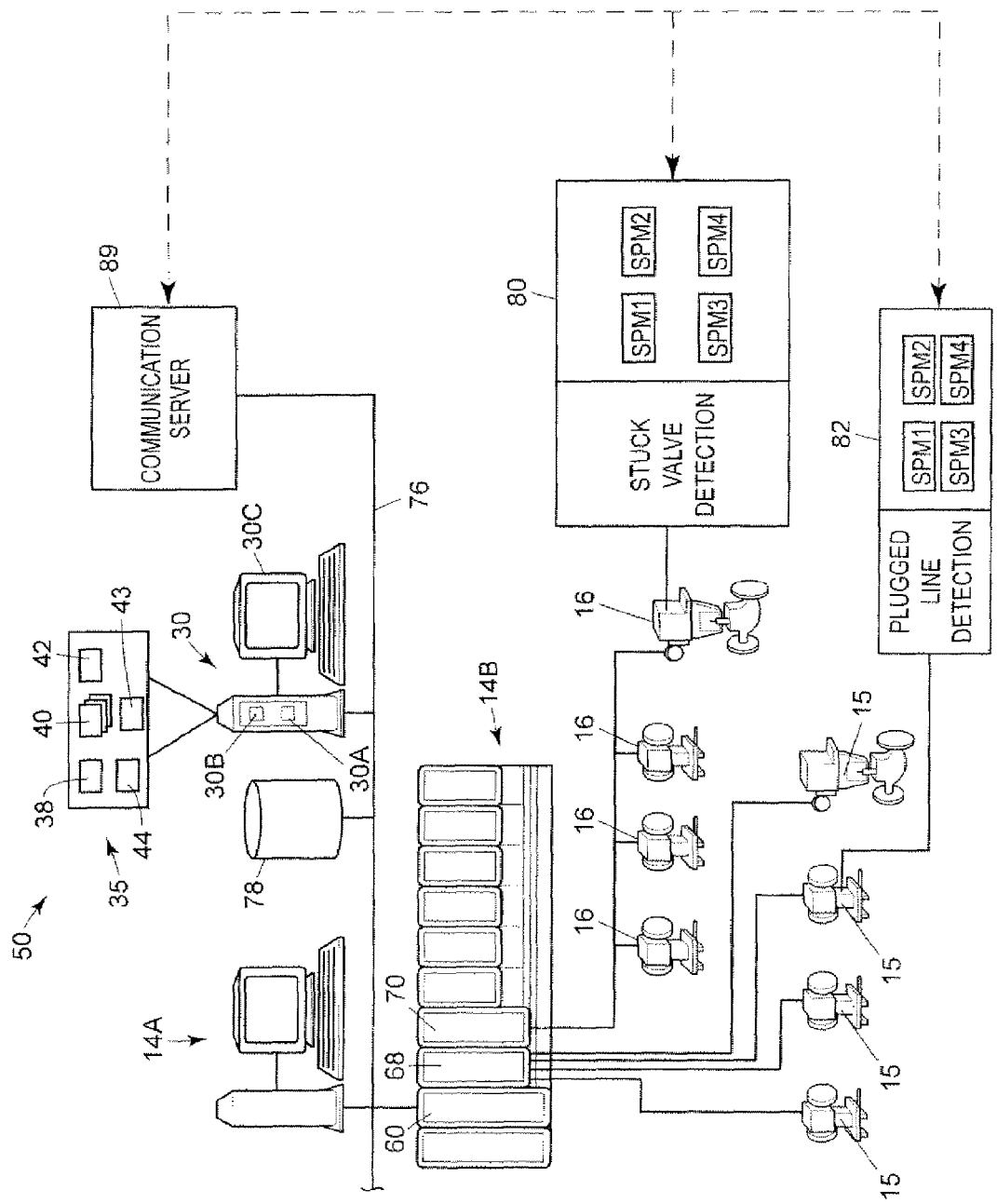
FIG. 2 is an exemplary block diagram of a portion of the process plant of FIG. 1, illustrating communication interconnections between various components of a fault detection and isolation system located within different elements of the process plant.

FIG. 2 illustrates a portion 50 of the example process plant 10 of FIG. 1 for the purpose of describing one manner in which the configuration and data collection application 38 of the FDI system 35 may collect statistical signature data for use in determining the existence of an abnormal condition. While FIG. 2 illustrates communications between the FDI system 35 applications 38, 40, 42 and 44, and the database 43 and one or more data collection blocks within HART® and Fieldbus field devices 15 and 16, it will be understood that similar communications can occur between the FDI system 35 applications 38, 40, 42 and 44, and other entities within the process plant 10, including any of the devices, equipment, controllers, workstations, etc. illustrated in FIG. 1. Likewise, individual sub-systems, such as the process control systems 12 and 14, or the power generation and distribution system 24, may implement, in addition to or instead of that implemented on the computer 30, the FDI system 35, including its component applications 38, 40, 42 and 44.

The portion 50 of the process plant 10 illustrated in FIG. 2 includes a distributed process control system 14B having one or more process controllers 60 connected to one or more field devices 15 and 16 via input/output (I/O) cards or devices 68 and 70, which may be any desired types of I/O devices conforming to any desired communication or controller protocol. The field devices 15 are illustrated as HART® field devices and the field devices 16 are illustrated as Fieldbus field devices, although these field devices could use any other desired communication protocols. Additionally, the field devices 15 and 16 may be any types of devices such as, for example, sensors, valves, transmitters, positioners, etc., and may conform to any desired open, proprietary or other communication or programming protocol, it being understood that the I/O devices 68 and 70 must be compatible with the desired protocol used by the field devices 15 and 16.

In any event, one or more user interfaces or computer systems 14A and 30 (which may be any types of personal computers, workstations, etc. accessible by plant personnel such as configuration engineers, process control operators, maintenance personnel, plant managers, supervisors, etc.) are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 15 and 16 within the process plant 10. Thus, the database 78 may operate as a configuration database to store the current configuration, including process configuration modules, as well as control configuration information for the process control system 14B as downloaded to and stored within the process controllers 60 and the field devices 15 and 16. Likewise, the database 78 may store historical abnormal condition prevention data, including reference or monitored statistical signature data collected by the field devices 15 and 16 within the process plant 10 or reference or monitored statistical signature data determined from process variables collected by the field devices 15 and 16.

While the process controllers 60, I/O devices 68 and 70, and field devices 15 and 16 are typically located down within and distributed throughout the sometimes harsh plant environment, the workstations 14A and 30, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block may be a part or a subroutine of an overall control routine and operates in conjunction with other function blocks (via communications links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the computer system 30 includes a processor 30A, a memory 30B and a display device 30C. The memory 30B stores applications 38, 40, 42 and 44 discussed with respect to FIG. 1 in a manner that these applications can be implemented on the processor 30A to provide information to a user via the display 30C (or any other display device, such as a printer). Although the following description is generally made with reference to collecting and processing raw process variable data from a device, such as a field device, it should be understood that the techniques described herein are not limited thereto, and may be applied to various other aspects of the plant 10 that may utilize monitoring and detection of abnormal conditions.

Additionally, as shown in FIG. 2, some (and potentially all) of the field devices 15 and 16 include data collection and processing blocks 80 and 82. While the blocks 80 and 82 are described with respect to FIG. 2 as being advanced diagnostics blocks (ADBs), which are known Foundation Fieldbus function blocks that can be added to Fieldbus devices to collect and process statistical signature data within Fieldbus devices, for the purpose of this discussion, the blocks 80 and 82 could be or could include any other type of block or module located within a process device that collects raw process variable data and calculates or determines one or more statistical measures for that data, whether or not these blocks are located in Fieldbus devices or conform to the Fieldbus protocol. While the blocks 80 and 82 of FIG. 2 are illustrated as being located in one of the devices 15 and in one of the devices 16, these or similar blocks could be located in any number of the field devices 15 and 16, could be located in other devices, such as the controller 60, the I/O devices 68, 70 or any of the devices illustrated in FIG. 1. Additionally, the blocks 80 and 82 could be in any subset of the devices 15 and 16.

Generally, the blocks 80 and 82, or sub-elements of the blocks 80 and 82, collect data, such as raw process variable data, within the device in which they are located and perform statistical processing or analysis on the collected data, for example to aid in fault detection and isolation and in abnormal situation prevention. In addition, the block 80 includes one or more statistical process monitoring (SPM) blocks or units SPM1-SPM4. The statistical process monitoring (SPM) block provides functionality that performs statistical process monitoring on at least one process variable or other process parameter, and may be performed by any desired software, firmware or hardware within the device or even outside of a device for which data is collected. As an example and referring to FIG. 2, the block 80, illustrated as being associated with a valve, may include or otherwise utilize a stuck valve detection routine to analyze the valve process variable data in order to determine if the valve is in a stuck condition. The SPM blocks SPM1-SPM4 may collect raw process variable or other data within the valve, and perform one or more statistical calculations on the collected data to determine, for example, a mean, a median, a standard deviation, a root-mean-square (RMS), a rate change, a range, a minimum, a maximum, etc. of the collected data and/or to detect events such as drift, bias, noise, spikes, etc., in the collected data.

Although examples of statistical signature data have been provided, it should be understood that the statistical signature data may include different types of statistical signature data for any statistical measure representative of the process. Additionally, while an example for generating statistical signature data has been provided, it should be understood that the SPM blocks may use a variety of techniques to generate the statistical signature data. For example, while the SPM blocks discussed herein may be known Foundation Fieldbus SPM blocks, the statistical process monitoring (SPM) block may be any type of block or element that collects data, such as raw process variable data, and performs some statistical processing on the data to determine a statistical measure, such as a mean, a standard deviation, etc. An SPM block may be implemented as software or firmware or other elements that perform the function of the SPM block, whether these elements are in the form of function blocks, or other types of blocks, programs, routines or elements and whether or not these elements conform to the Foundation. Fieldbus protocol, or some other protocol, such as PROFIBUS, WORLDFIP, Device-Net, AS-Interlace, HART, CAN, etc., protocols.

It should also be understood that, because the SPMs are generally located in the devices where the raw process variable data is collected, the SPMs can acquire quantitatively and qualitatively more accurate process variable data. However, as described further below, SPM blocks may be placed outside of the device that collects or generates the process variable data, for example if the device does not have or does not support SPM functionality, although SPM blocks within the device may be capable of determining better statistical calculations with respect to the collected raw process variable data than a block located outside of the device.

As another example, FIG. 2 illustrates the block 82 being associated with a transmitter having a plugged line detection unit that analyzes the raw process variable data collected by the transmitter to determine if a line within the plant is obstructed. In addition, the block 82 includes a set of SPM blocks or units SPM1-SPM4 which may collect raw process variable data or other data within the transmitter, and perform one or more statistical calculations on the collected data to determine statistical measures, for example, a mean, a median, a standard deviation, etc. of the collected data. If desired, the underlying operation of the blocks 80 and 82 may be performed or implemented as described in U.S. Pat. No. 6,017,143 referred to above. While the blocks 80 and 82 are illustrated as including four SPM blocks each, the blocks 80 and 82 could have any other number of SPM blocks therein for collecting and determining statistical signature data. Likewise, while FIG. 2 illustrates the blocks 80 and 82 as including detection software for detecting particular conditions within the plant 10, the blocks 80 and 82 may be provided without such detection software. Still further, while FIG. 2 illustrates the SPM blocks discussed herein as being sub-elements of ADBs, they may instead be stand-alone blocks located within a device.

The ADBs, or the SPM blocks which may be provided therein, discussed with respect to FIG. 2 may calculate statistical signature data associated with a process and may, in addition to communicating the statistical signature data to one of the workstations 14A or 30, trigger certain alerts, based on changes in the values of the statistical signature data. By way of example, Fieldbus type SPM blocks may monitor process variables and provide various monitoring parameters. These parameters may include, but are not limited to, Block Tag, Block Type, Mean, Standard Deviation, Mean Change, Standard Deviation Change, Baseline Mean, Baseline Standard Deviation, High Variation Limit, Low Dynamics Limit, Mean Limit, Status, Parameter Index, Time Stamp and User Command. As seen above, the parameters may therefore include various statistical measures, including a mean, a standard deviation, a standard deviation change, etc. For example, the Mean is the average value of a process variable over a sampling window. The Mean, $\bar{x}$, may be calculated as follows:

$$\bar{x} = \frac{1}{n}\sum_{i=1}^{n} x_i \qquad (\text{eq. 1})$$

where n=the number of samples $x_1, x_2, \ldots x_n$=the values of the variable taken during the sample window The Standard Deviation, s, is a measure of how much the data varies from its mean. The Standard Deviation may be calculated as follows, where the denominator uses the term n−1 instead of n in order to provide an unbiased estimator of the standard deviation, given only a sample of the population:

$$s = \sqrt{\frac{\sum_{i=1}^{n}(x_i - \bar{x})^2}{n-1}} \qquad (\text{eq. 2})$$

While, Mean and Standard Deviation may be particularly useful parameters, other SPM parameters that may also be useful include Baseline Mean, Baseline Standard Deviation, Mean Change, Standard Deviation Change, and Status. Of course, the SPM blocks may be used to determine any other desired statistical measures or parameters and could provide other parameters associated with a particular block to a user or requesting application. Thus, SPM blocks are not limited to providing only the parameters discussed herein.

Referring still to FIG. 2, the parameters of the SPM blocks (SPM1-SPM4) within the field devices 15 or 16 may be made available to an external client, such as to the workstation 30 through the bus or communication network 76 and the controller 60. Additionally or in the alternative, the statistical signature data and other information gathered by or generated by the SPM blocks (SPM1-SPM4) within the blocks 80 and 82 may be made available to the workstation 30 through, for example, an OPC server 89. This connection may be a wireless connection, a hardwired connection, an intermittent connection (such as one that uses one or more handheld devices) or any other desired communication connection using any desired or appropriate communication protocol. Of course, any of the communication connections described herein may use an OPC communication server to integrate data received from different types of devices in a common or consistent format.

As mentioned above, it is possible to place SPM blocks outside of the devices that collect the raw process variable data or other data. For example, it is possible to place SPM blocks in host devices, devices other than field devices, or other field devices to perform statistical process monitoring outside of the device that collects or generates the raw data, such as the raw process variable data. Thus, for example, the configuration and data collection application 38 of FIG. 2 may include one or more SPM blocks that collect raw process variable data via, for example, the OPC server 89 and which calculate some statistical measure or parameter, such as a mean, a standard deviation, etc. for that raw process variable data. SPM blocks not located in the device which collects the raw data may be helpful in generating statistical signature data for devices or process variables within devices that do not have or support SPM functionality. Although SPM blocks not located in the device may not be able to collect as much process variable data to perform the statistical calculations as SPM blocks located in the device due to the communication requirements for this data (e.g., communication bandwidth), available throughput of networks may increase over time as technology improves. As such, SPM blocks not located in a device that collects the raw data may be able to collect more raw process variable data to perform the statistical calculations. Thus, it will be understood from the discussion below, that any statistical measures or parameters generated by SPM blocks, may be generated by SPM blocks such as the SPM1-SPM4 blocks in the blocks 80 and 82, or in SPM blocks within a host or other devices including other field devices.

As the number of statistical data collection blocks or SPMs increases in a process plant, it is helpful to have an automated mechanism that gathers the data from the SPM blocks in the different devices, to analyze the data and to provide detection results to an expert system for further data aggregation and decision-making. As described above, data collected by the field devices 15 and 16 within the process plant 10 may be aggregated in the database 78, the statistical process monitoring database 43, or any other memory suitable for storing raw process variable data. In addition to raw process variable data, the data may include statistical signature data processed by the SPM blocks in field devices 15 and 16, or may be statistical signature data determined by the PCA module 42 from the raw process variables collected by the field devices 15 and 16.

Figure 3:
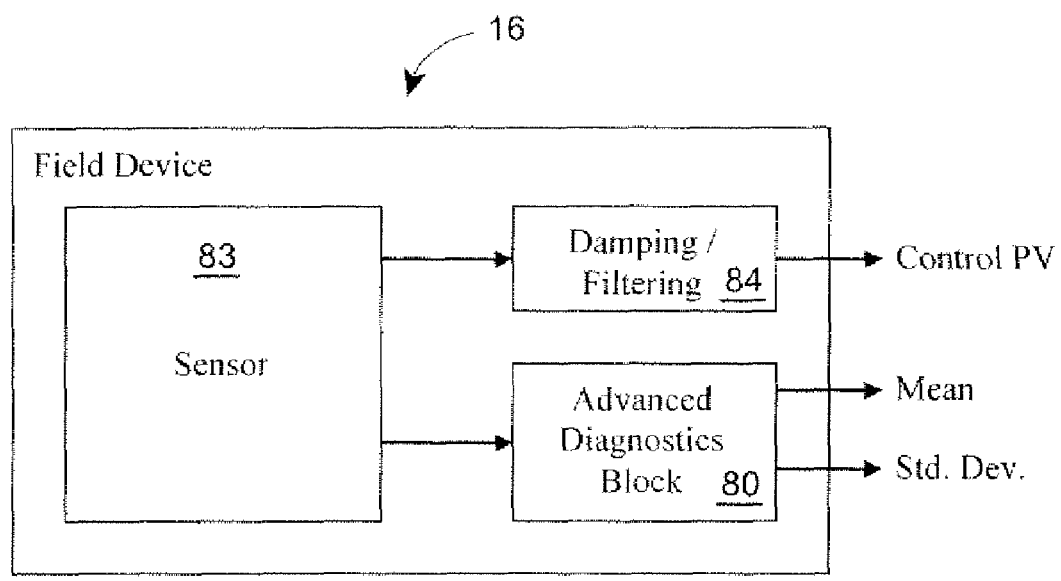
FIG. 3 is an exemplary block diagram of one of the field devices of FIG. 2, illustrating the raw process variable and statistical signature outputs of the field device.

FIG. 3 is a block diagram of a field device, such as the field devices 15 and 16, illustrating the outputs of such a device that may be available as inputs to the FDI system 35. The field device 16 includes a sensor 83, a filter block 84, and an ADB 80. The ADB 80 includes one or more SPMs for calculating statistical signatures for process variables. In many systems, each field device 16 communicates its measured process variable to the controller 12B or 14B (see FIG. 1) via a 4-20 mA signal on its own pair of wires. The milliamp current signal varies in proportion to the process variable represented. Thus, the lower end of the 4-20 mA range generally corresponds to 0% of the calibrated range, while 20 mA generally corresponds to 100% of the calibrated range. Because most control and monitoring applications prefer a smooth and stable measurement signal, several layers of filters 84 are typically included between the sensor 83 and the controller 12B or 14B. Low-pass filtering is generally employed to allow the relatively steady 4-20 mA signal to pass, but removes higher-frequency noise.

The filters 84 remove the higher frequency noise from the signal to the controllers 12B and 14B. In many applications, however, the higher frequency noise contains useful information about the operation of the measured process. For example, the high-frequency component of a pressure signal in one type of industrial furnace can be indicative of flame instability. The filters 84 would remove this useful diagnostic information from the signal in a traditional instrumentation system and prohibit this type of diagnostics.

Many field devices 15 or 16 now use digital protocols to communicate with controllers 12B and 14B, allowing the devices to communicate additional information that may be useful in an FDI system. For example, the HART® protocol enables smart devices to engage in two-way digital communications on traditional 4-20 mA loops already in use, without disturbing the integrity of the 4-20 mA signal. HART® accomplishes this by superimposing digital communication signals at a low level on top of the 4-20 mA signal using Bell 202 Frequency Shift Keying (FSK). By contrast, the Fieldbus protocol is an all-digital, serial, two-way communications system that serves as a Local Area Network (LAN) for plant instrumentation and control devices, replacing entirely the individual pairs of wires of the 4-20 mA system. Other digital protocols include, for example, PROFIBUS®, WORLD-FIP®, Device-Net®, AS-Interface and CAN protocols. Digital protocols make it possible for a field device 15 or 16 to communicate more than its primary process variable (e.g., pressure, temperature, etc.) to the controller 12B or 14B, and ultimately to the computer system 30 implementing the FDI system 35. While the filters 84 remove higher frequency information from the analog signal, one or more SPM blocks in the ADB 80 may still use the higher frequency information in that signal to compute a number of statistical measures for a process variable, such as a mean, a median, a standard deviation, etc. Having calculated statistical signatures such as a mean or a standard deviation from the raw analog signal, a field device 15 or 16 using a digital protocol can communicate both the raw process variable data and the statistical signature data to the controller 12B or 14B.

The controllers 12B and 14B are communicatively coupled to the FDI system 35 by any suitable method such as Ethernet, Modbus, HTML, XML, proprietary techniques and/or protocols etc., as described above. This coupling may be direct or through an intermediary system such as one of the computers 22 or 26. Those skilled in the art may conceive of many configurations in which devices may communicate data to the FDI system 35 for use by the PCA module 42.

As described above, the PCA module 42 analyzes process variable data associated with known normal and abnormal process conditions to determine principal components that represent the largest amount of total variance in the process variable data. The PCA technique transforms a set of data from a high dimensional space to a lower dimensional space, capturing only the most important variations. In particular, for a given set of data, m is the number of variables and n is the number observations (e.g., data points) of each variable. A matrix X is an n×m matrix containing all of the observations for all of the input variables.

In a typical process, some process variables have magnitudes significantly larger than others. In order to ensure that each process variable has an equal effect on the model, it may be desirable to autoscale the X data (e.g., sealing the data against itself) by subtracting the mean for each process variable from each data point and dividing by the standard deviation for the process variable. For the autoscaled matrix, the sample covariance matrix is calculated by:

$$S = \frac{1}{n-1} X^T X \qquad \text{(eq. 3)}$$

An Eigenvalue-Eigenvector decomposition is performed on the sample covariance matrix:

$$S \cdot V = V \cdot D \qquad \text{(eq. 4)}$$

If the Eigenvectors are normalized, then $S = V \cdot D \cdot V^T$, because V is an orthogonal matrix.

Here, D is a diagonal matrix containing the m Eigenvalues, and the columns of V are Eigenvectors corresponding to each of the Eigenvalues. After performance of the Eigenvalue-Eigenvector decomposition), the Eigenvalues (and corresponding Eigenvectors) are sorted from largest to smallest.

The largest Eigenvalue, and its corresponding Eigenvector, indicates the direction in a new linear space that corresponds to the largest variance in the original data set. The second largest Eigenvalue, and its Eigenvector, correspond to a direction, orthogonal to the first, with the second largest amount of variance. In a similar manner, all fit Eigenvalues, and their corresponding Eigenvectors, create an orthogonal transformation of the original linear space.

Typically, a given analysis retains the number of principal components, p, that represent the largest amount of variance, while discarding the m−p (i.e., m minus p) principal components representing the least variance. For raw process variable data, the p largest Eigenvalues correspond to the actual underlying variance in the process, while the m−p smallest Eigenvalues correspond to background noise.

Figure 4:
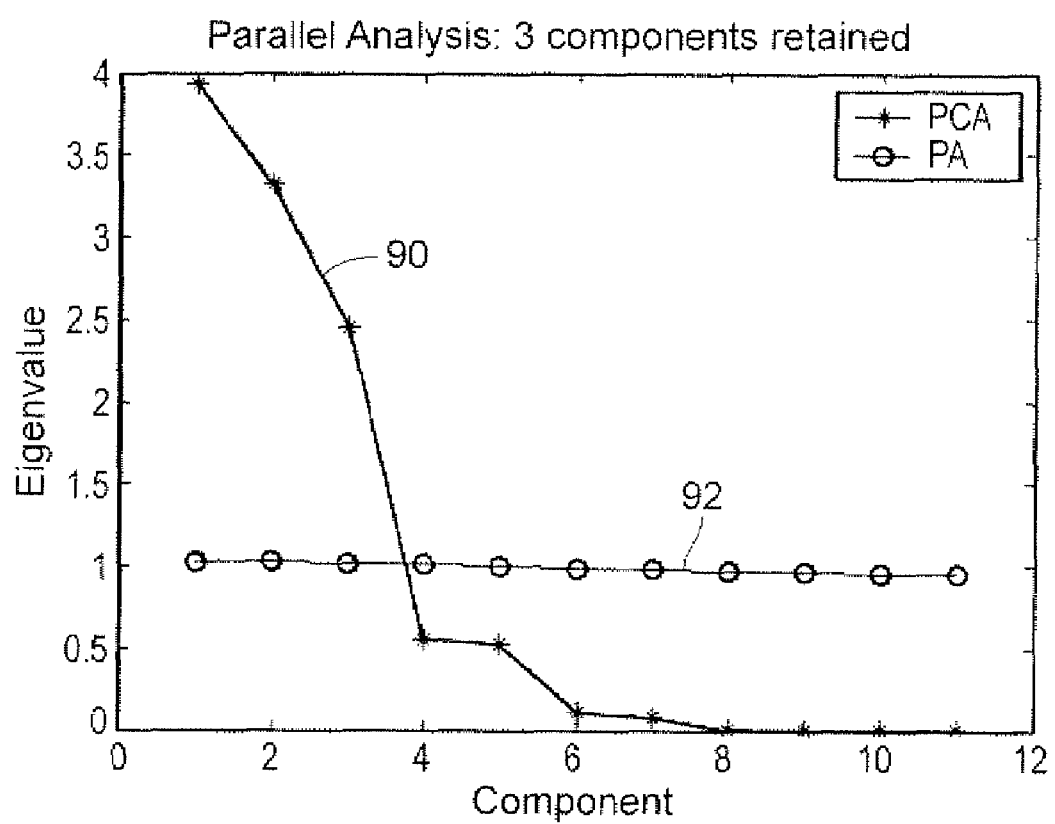
FIG. 4 is an exemplary plot illustrating the use of a parallel analysis in principle component analysis to determine the number of components to retain.

One of several methods may be used to determine how many principal components to retain. These methods include, by way of example and not limitation, cross-validation, parallel analysis, the percent variance test, the chi-square test, the scree test, and the Minimum Average Partial, Briefly, parallel analysis compares the Eigenvalues found in the Eigenvalue-Eigenvector decomposition against those that would have been obtained from a similar data set with independent measurements and observations. FIG. 4 illustrates an example of a use of parallel analysis to determine how many components to retain. The first line 90, labeled PCA, is a plot of the Eigenvalues of the PCA decomposition of some original data set. The second line 92, labeled PA shows a plot of the Eigenvalues of the PCA decomposition of a data set of the same size, but with independent variables and observations. According to the parallel analysis method, the point at which the two plots cross is the number of principal components to be retained. Thus, in the example of FIG. 4 three principal components will be retained.

When a represents the number of the largest Eigenvalues being retained, the loading matrix $P \in \Re^{m \times \alpha}$ is created by taking the first α columns from the Eigenvector matrix V. The projection of the original observations onto the new subspace defined by the loading matrix is called the score matrix, and denoted by T=XP.

The base PCA decomposition described above provides a method to reduce a data set of many correlated measurements into a few significant components. However, the detection and isolation of an abnormal condition may require additional logic, based on discriminant analysis. When PCA is utilized to discriminate between multiple fault cases, either a single PCA model may be developed for all fault classes or process conditions combined (PCA1) or a separate PCA model may be developed for each different fault class or process condition (PCAm). The example below uses the PCA1 approach, though those of ordinary skill in the art would readily appreciate that the PCAm approach could also be used.

Using the PCA1 approach, the data for all classes are stacked into a single matrix X, wherein the loading matrix is associated with a combination of conditions. Within a scheme using a single PCA model, any single observation x can be assigned to a condition according to the maximum score discriminant:

$$g_i(x) = \\ -\frac{1}{2}(x - \bar{x}_i)^T P(P^T S_i P)^{-1} P^T (x - \bar{x}_i) + \ln(p_i) - \frac{1}{2}\ln[\det(P^T S_i P)] \qquad \text{(eq. 5)}$$

where
x=Vector of original process variable measurements, which is to be classified
$g_i$=Likelihood that x belongs to fault class i
$\bar{x}_i$=Mean vector of all observations belonging to class i
P=PCA Loading Matrix
$S_i$=Covariance matrix of all observations belonging to class i
$p_i$=a priori probability of an observation belonging to class i Although described as a fault class i, each class i may relate to any process condition, including a normal condition, an existing abnormal condition or a predicted abnormal condition. For each class i, the maximum score discriminant (eq. 5) is run for a given observation x, and the condition for observation x is identified based on the calculated likelihood $g_i(x)$ for each class i. Thus, a given observation x is assigned to the class i, for which $g_i(x)$ is the maximum.

In the case of fault detection in an industrial process, there is typically no a priori probability known for each of the fault classes. In this case, $p_i=0$ may be assumed for all i, and the score discriminant reduces to:

$$g_i(x) = (x-\bar{x}_i)^T P(P^T S_i P)^{-1} P^T (x-\bar{x}_i) + \ln[\det(P^T S_i P)] \qquad \text{(eq. 6)}$$

with an observation x being assigned to the class i for which $g_i(x)$ is the minimum.

While the following description describes fault detection using PCA primarily with respect to statistical signature data, it should be understood that PCA may also be used with raw process variable data rather than statistical signature data, as noted throughout the description. However, it is possible that the raw process variable data may contain data point outliers or otherwise erroneous data points within the set, which may indicate a false condition in the process. As such, it may be preferable to utilize statistical signature data to account for, or minimize the effects of, data point outliers or other erroneous data contained within a set of raw process variable data, by generating statistical measures of the process variables from the raw process variable data. Statistical signature data may also provide additional information (e.g. variance) about the process which may not be readily apparent from raw process variable data alone. Further, although the following description describes fault detection using PCA to detect the existence of abnormal conditions, it should be understood that PCA or other multivariate statistical analysis techniques may be used for abnormal condition prevention to predict the future occurrence of abnormal conditions.

In order to accomplish fault detection using PCA, it may be desirable to collect and analyze reference raw process variable data correlated to both normal and abnormal conditions in a process, for comparison with monitored process variable data. Statistical signature data may be developed from the collected raw process variable data, for example using the SPM blocks described above, to provide statistical signature data for known normal conditions in a process and for known abnormal conditions in the process. Using the reference statistical signature data (or the reference raw process variable data) associated with normal operation of a process, the PCA module 42 can determine the principal components for the process under normal conditions. Further, the PCA module 42 can determine from the statistical signature data (or from the reference raw process variable data) the principal components for the process under any abnormal condition for which associated reference statistical signature data (or reference raw process variable data) exists. As such, using the PCA1 method, principal components for a combination of known normal and/or known abnormal situations may be developed in which the same PCA model is associated with multiple conditions (e.g., all fault cases). Alternatively, using the PCAm approach, principal components for known normal and known abnormal situations may be developed for a variety of process variables.

With the SPM block having generated reference statistical signature data from reference raw process variable data collected by the configuration and data collection application 38, and the PCA module 42 having determined a loading matrix associated with the reference statistical signature data (or reference raw process variable data), the fault detection module 44 may analyze monitored statistical signature data (or monitored raw process variable data). The fault detection module 44, projecting the monitored statistical signature data (or the monitored raw process variable data) onto the subspace defined by the loading matrix as described above, may categorize the monitored statistical signature data (or the monitored raw process variable data) as indicating of the presence or predicted future occurrence of either a normal or an abnormal process condition. If the monitored process variable data indicates a current or predicted abnormal condition, the fault detection module 44 may indicate which fault case is present or predicted. While a trending analysis may be provided to predict the future occurrence of a normal or abnormal process condition, it should be understood that various other prediction techniques may be provided.

Figure 5:
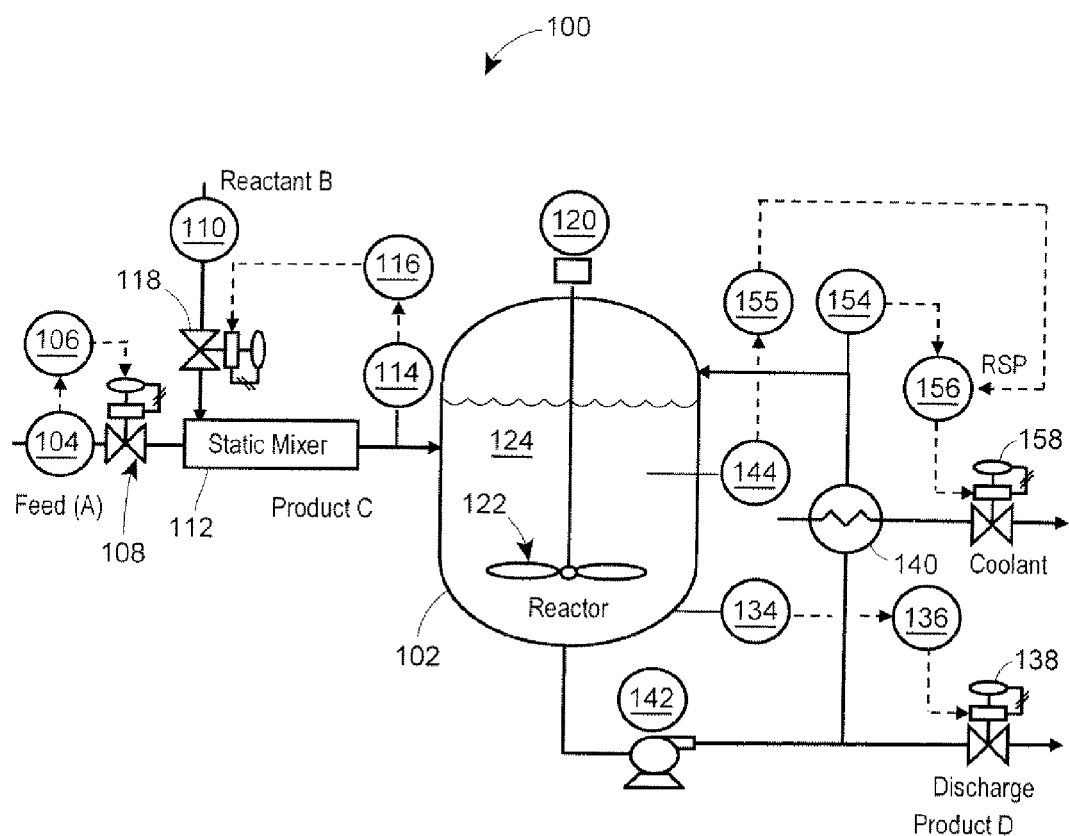
FIG. 5 is an exemplary block diagram of a continuous reactor process having a plurality of field devices, in which a principal component analysis of statistical signature data may be implemented.

FIG. 5 illustrates a control diagram for an example process 100 having a continuous reactor 102, which may employ statistical measures with PCA in an FDI system. The process 100 is provided only as an example, and the particular system and chemical reaction are explained in order to better understand the fault detection and abnormal condition prevention methodology employed. However, it should be understood that employing statistical signatures with PCA in an FDI system may be extended to any process. Further, while the following example primarily relates to detecting existing abnormal conditions, it should be understood that the methodology may likewise be employed to predict future abnormal conditions where the FDI system is replaced with or includes an abnormal condition prevention system, as with the FDI system 35. In the process 100, Reactant A is sodium hydroxide and Reactant B is ethyl acetate. Reactant A and Reactant B combine to form the product sodium acetate (Product C) and the byproduct ethyl alcohol (product D). The reactants and products from the static mixer 112 flow into the stirred reactor 102, where an agitator 122 drivers a further reaction, making the conversion more complete. During this process, optimal performance requires the maintenance of both the temperature and level of the contents 124 of the reactor 102. The reaction is exothermic, and therefore requires cooling to maintain the optimal temperature in the reactor 102.

Reactant A flows into the system through a feed valve 108. A flow rate transmitter 104 measures the flow rate of Reactant A through the feed valve 108. A controller block 106, receives a process variable signal from the flow rate transmitter 104, and regulates the flow of Reactant A to a constant set point by sending a control signal to the feed valve 108 controlling the flow of Reactant A. Reactant B likewise flows into the system through a feed valve 118. A flow rate transmitter 110 measures the flow rate of Reactant B through the feed valve 118. Both Reactant A and Reactant B flow through a static mixer 112, where they combine to form Product C. A conductivity transmitter 114 measures the concentration of Product C as it flows out of the static mixer 112. A controller block 116, receiving a process variable signal from the conductivity transmitter 114, regulates the flow of Reactant B into the static mixer 112 (and thereby the concentration of Product C) by sending a control signal to the feed valve 118 controlling the flow of Reactant B.

The sodium acetate (Product C) flows from the static mixer 112 to the reactor 102. An agitator motor 120 drives the agitator 122 within the reactor 102, stirring the contents 124 of the reactor 102 and causing the further reaction, which chances the sodium acetate to ethyl alcohol (Product D). As mentioned above, optimal process performance requires maintenance of both the level and the temperature of the contents 124. A level transmitter 134 measures the level of the contents 124 of the reactor 102. A controller block 136, receives a process variable signal from the level transmitter 134, and regulates the flow of ethyl alcohol out of the reactor 102 by sending a control signal to the discharge valve 138 controlling the discharge of ethyl alcohol and maintaining the level of the contents 124 of the reactor 102 at the desired set point. Likewise, a temperature transmitter 144 measures the temperature of the reactor 102. A pump 142 pulls ethyl alcohol out of the reactor 102. Some portion of the ethyl alcohol being pumped out of the reactor 102 by the pump 142 is discharged to the next stage of the system (not shown), while the remainder of the ethyl alcohol being pumped out of the reactor 102 by the pump 142 flows through a heat exchanger 140 where it is cooled and recirculated back into the reactor 102.

The cooling effected by the heat exchanger 140 maintains the reaction within the reactor 102 at the desired temperature. A temperature transmitter 154 measures the temperature of ethyl alcohol flowing out of the heat exchanger 140. The process 100 uses a cascaded control algorithm to regulate the flow of the coolant to maintain the appropriate temperature in the reactor 102. A master controller block 155, receiving a process variable signal from the temperature transmitter 144, sends a control signal to a slave controller block 156 which also receives information from the temperature transmitter 154. The slave control block 156 adjusts the flow rate of the coolant through the heat exchanger 140 by sending a control signal to the coolant valve 158.

It is noted that the field devices do not need to communicate directly from one device to another. For example, the controller block 106 and/or feed valve 108 need not receive a signal directly from the flow rate transmitter 104. Instead, field devices may also receive a signal through some intermediary entity, such as a controller or computer system.

The example process 100 illustrated in FIG. 5 has in it eleven process variables, shown below in Table 1:

TABLE 1

| # | Tag | Description | Unit |
|---|-----|-------------|------|
| 1 | 104 | Flow Rate of Reactant A | kg/s |
| 2 | 106 | Controller Output to the Feed Valve (108) Regulating Reactant A Flow | % |
| 3 | 110 | Flow Rate of Reactant B | kg/s |
| 4 | 114 | Acid Concentration of Product C | % |
| 5 | 116 | Controller Output to Feed Valve (118) Regulating Reactant B Flow | % |
| 6 | 134 | Level of Contents (124) in the Reactor (102) | %-vol |
| 7 | 136 | Controller Output to the Discharge Valve (138) Regulating Level of Contents (124) in the Reactor (102) | % |
| 8 | 144 | Temperature of Contents (124) in the Reactor (102) | ° C. |
| 9 | 155 | Output of Master Controller Block Regulating Reactor (102) Temperature | ° C. |
| 10 | 154 | Temperature of Product D After Cooling by Heat Exchanger (140) | ° C. |
| 11 | 156 | Output of Slave Controller Block to the Valve (158) Regulating Coolant Flow | % |

In the example process 100 illustrated in FIG. 5 there could exist a number of abnormal conditions. In order to generate reference statistical signature data (or reference raw process variable data) for the PCA to use in determining the principal components associated with both normal and abnormal process conditions, the process may be monitored during normal operation and, individually, during a variety of abnormal conditions. The abnormal conditions may be induced either in the physical process, or in a computer simulation of the process. For example, one could induce the faults listed in Table 2, although those of ordinary skill in the art will appreciate that the faults listed in Table 2 do not constitute an exhaustive list of possible faults. The faults listed in Table 2 are those induced in the process 100 of FIG. 5, given the process and accompanying instrumentation implemented in the process. Many other faults and types of faults could exist in other processes or different implementations of the described process 100.

TABLE 2

| # | Abbr. | Full Name |
|---|-------|-----------|
| 1 | Upset_A | Upset (cycling) in the concentration level of Reactant A |
| 2 | HX_Foul | Fouling on the product side of the Heat Exchanger (140) |
| 3 | Temp_Err | Measurement bias error in temperature transmitter 144 |
| 4 | Lev_Err | Measurement bias error in level transmitter 134 |
| 5 | FV_Deg | Degradation in the performance of the Feed Valve 108 controlling the inlet flow rate of Reactant A |

Alternatively, rather than inducing abnormal situations in the process, previously collected monitored statistical signature data (or monitored raw process variable data) may be utilized. For example, data stored in the statistical process monitoring database 43 (see FIG. 1), the database 78 (see FIG. 2), or any other memory suitable for storage of the data, may be used as reference statistical signature data (or reference raw process variable data) for known normal conditions and known abnormal conditions. Process variable data for a period or periods associated with the existence of an abnormal condition could be used to determine the principal components corresponding to each of the fault cases in Table 2, so long as the existence of an abnormal condition attributable to a given fault can be correlated with a specific set process variable data.

For the list of faults induced (or otherwise analyzed) in the above table, there exist eight classes of observations. One class of observations is the normal operation of the process. Upset in Reactant A, heat exchanger fouling, and feed valve degradation each constitute another class of observations. Lastly, for each of the measurement bias errors, the transmitter reading could be higher than the actual value or lower than the actual value. Therefore, each could be in one of two directions (high or low) and constitute two classes of observations.

PCA on Raw Process Variable Data

As an example of utilizing PCA on raw process variable data in a process, such as the process 100 illustrated in FIG. 5, a reactor system for the production of ethyl alcohol, is collected from the process 100 with the process in a normal operating condition and each of the abnormal conditions listed in Table 2. Throughout the entire data collection period, the system sampled all process variables simultaneously at a rate of approximately one sample every 1-2 seconds. The system collected data for one hour in the normal operating condition. The first abnormal condition (upset in Reactant A concentration) was induced, and the system collected data for one hour, with the process in that abnormal state. After resetting the process to the normal state, the above series of events was repeated 6 additional times to collect data for each of the remaining fault states (see Table 2). Thus, altogether, there were approximately 14 hours, or 33,000 samples, of data collected.

Each time the process 100 resumed its normal state, several minutes passed before all the process variables stabilized and returned to their normal values. Thus, some post-processing was used with the process variable data to remove the data from the transitional period between fault and normal operating conditions. The post-processing removed the first half (30 minutes) of the data for each data set collected during the normal state. While the process 100 typically returned to its normal operating state in significantly less time, the post-processing ensured that the normal operating condition class would not contain any data from the transitional period.

Figure 6:
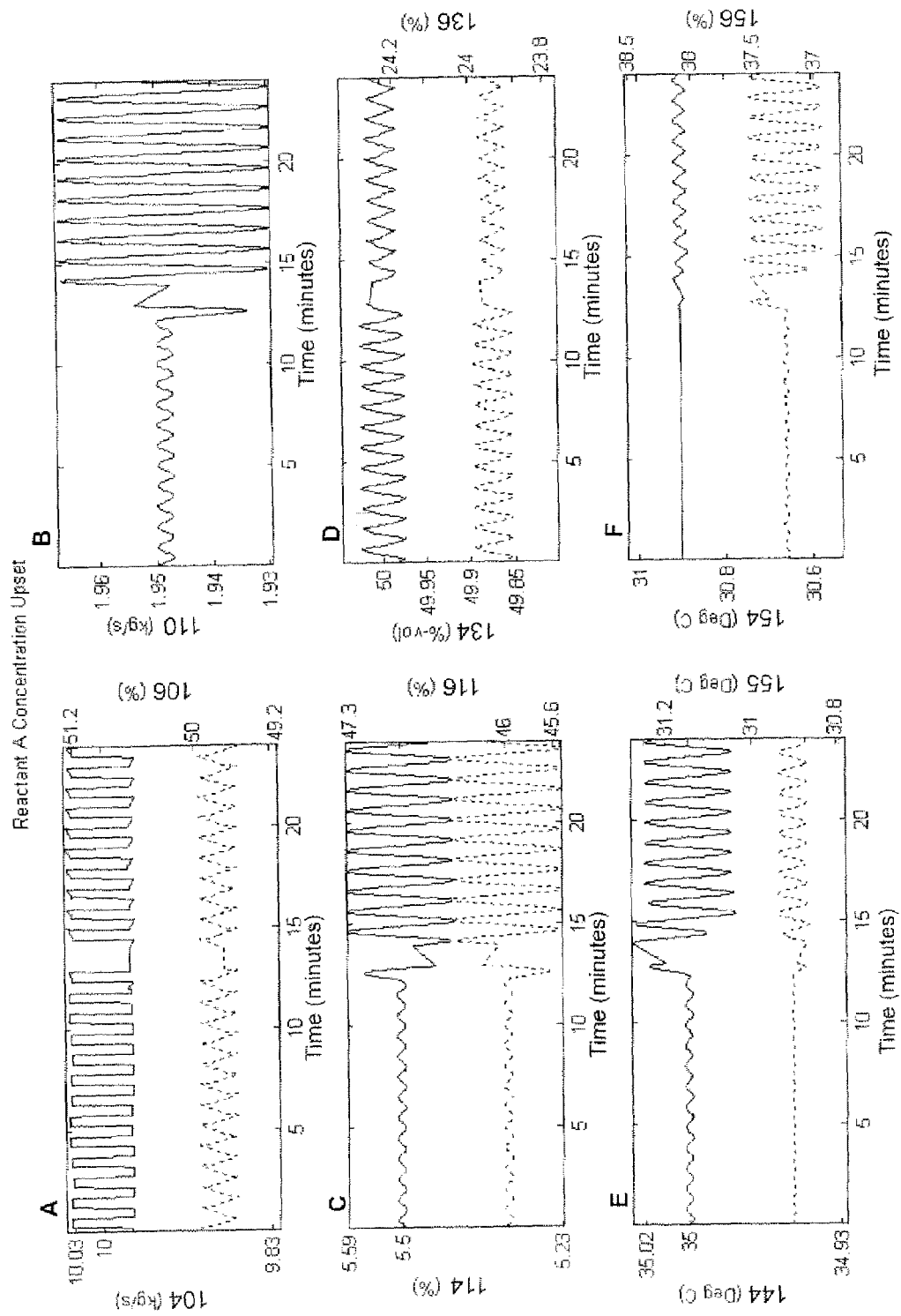
FIG. 6 is a depiction of a series of exemplary plots of raw process variable data versus time for a single fault case associated with the continuous reactor process of FIG. 5.

FIG. 6 shows a plot of process variable data versus time, collected from the process 100 illustrated in FIG. 5 for the case of a Reactant A concentration upset. The figure shows data for each of the eleven process variables (see Table 1). The plots in FIG. 6 show each process variable first in a normal condition. At approximately the 12-minute mark, the fault is induced in the example process 100. Plots A and C-F of FIG. 6, each show plots of data for two process variables. On the top, and corresponding to the left vertical axis, is data associated with the transmitter process variable. On the bottom, and corresponding to the right vertical axis, is data associated with the controller process variable that reacts to the transmitter process variable. Plot B shows a plot of data for a single transmitter process variable to which no controller directly responds, but which may still be indicative of an abnormal condition.

Figure 7:
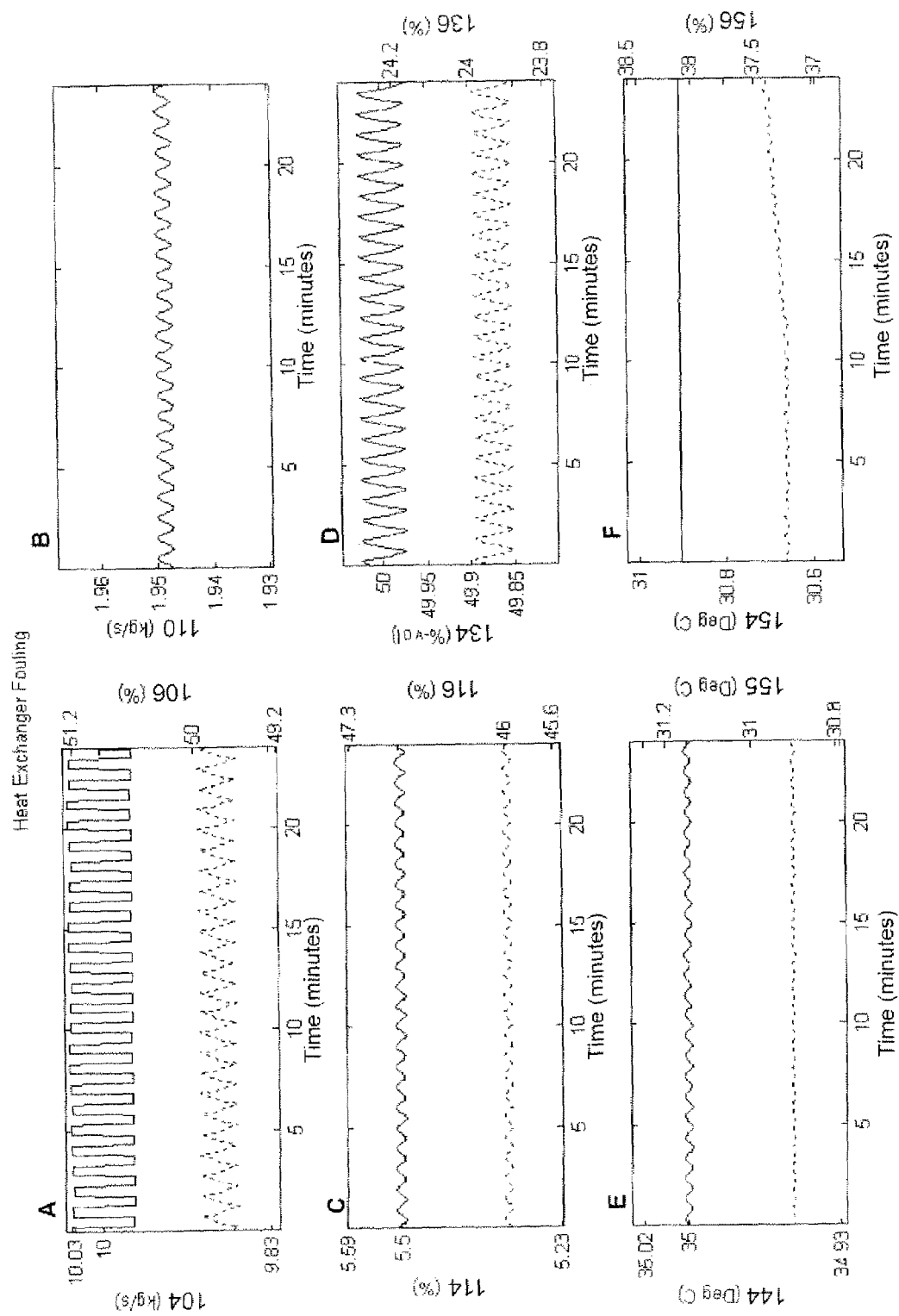
FIG. 7 is a depiction of a series of exemplary plots of raw process variable data versus time for a second fault case associated with the continuous reactor process of FIG. 5.
Figure 8:
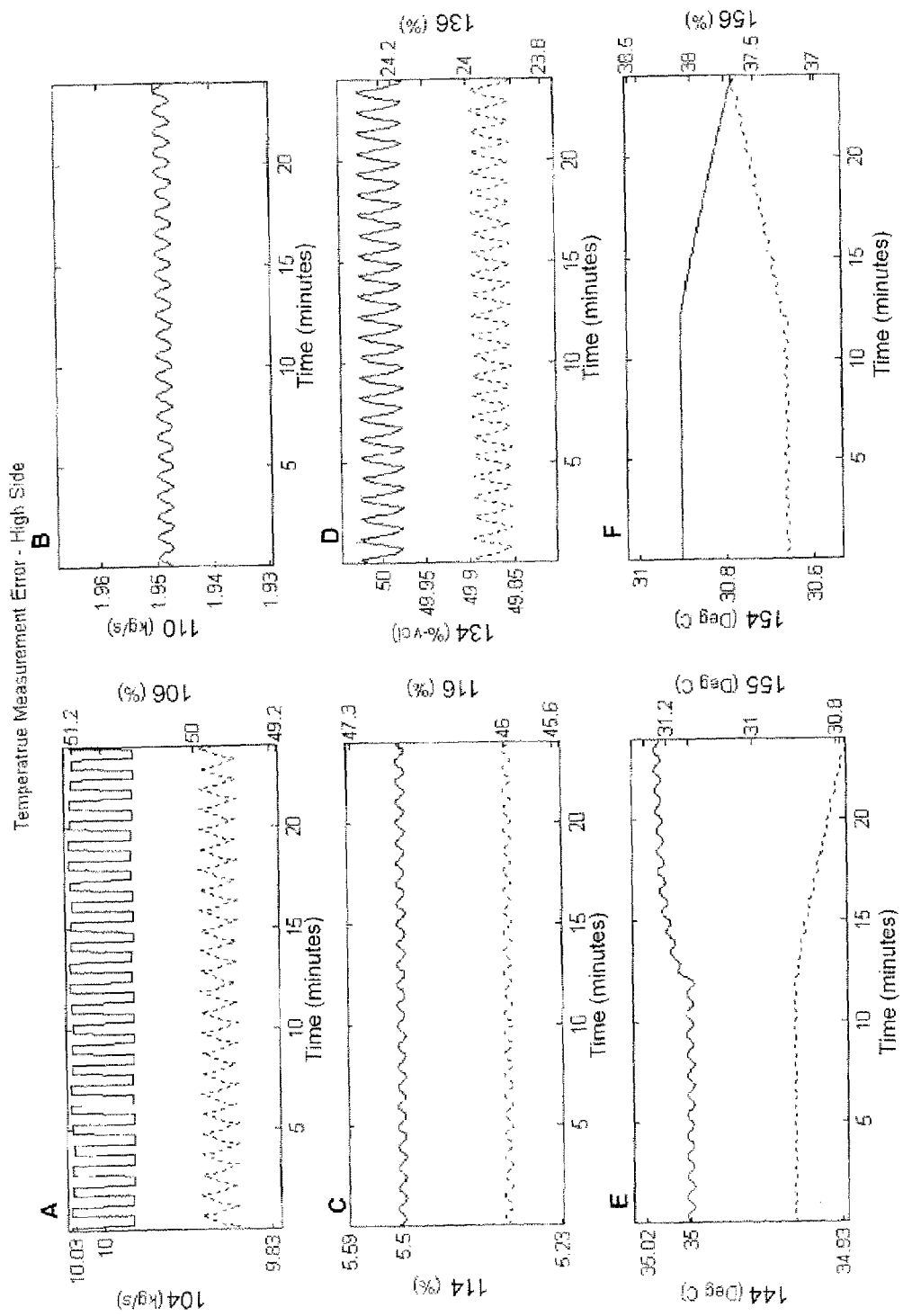
FIG. 8 is a depiction of a series of exemplary plots of raw process variable data versus time for a third fault case associated with the continuous reactor process of FIG. 5.
Figure 9:
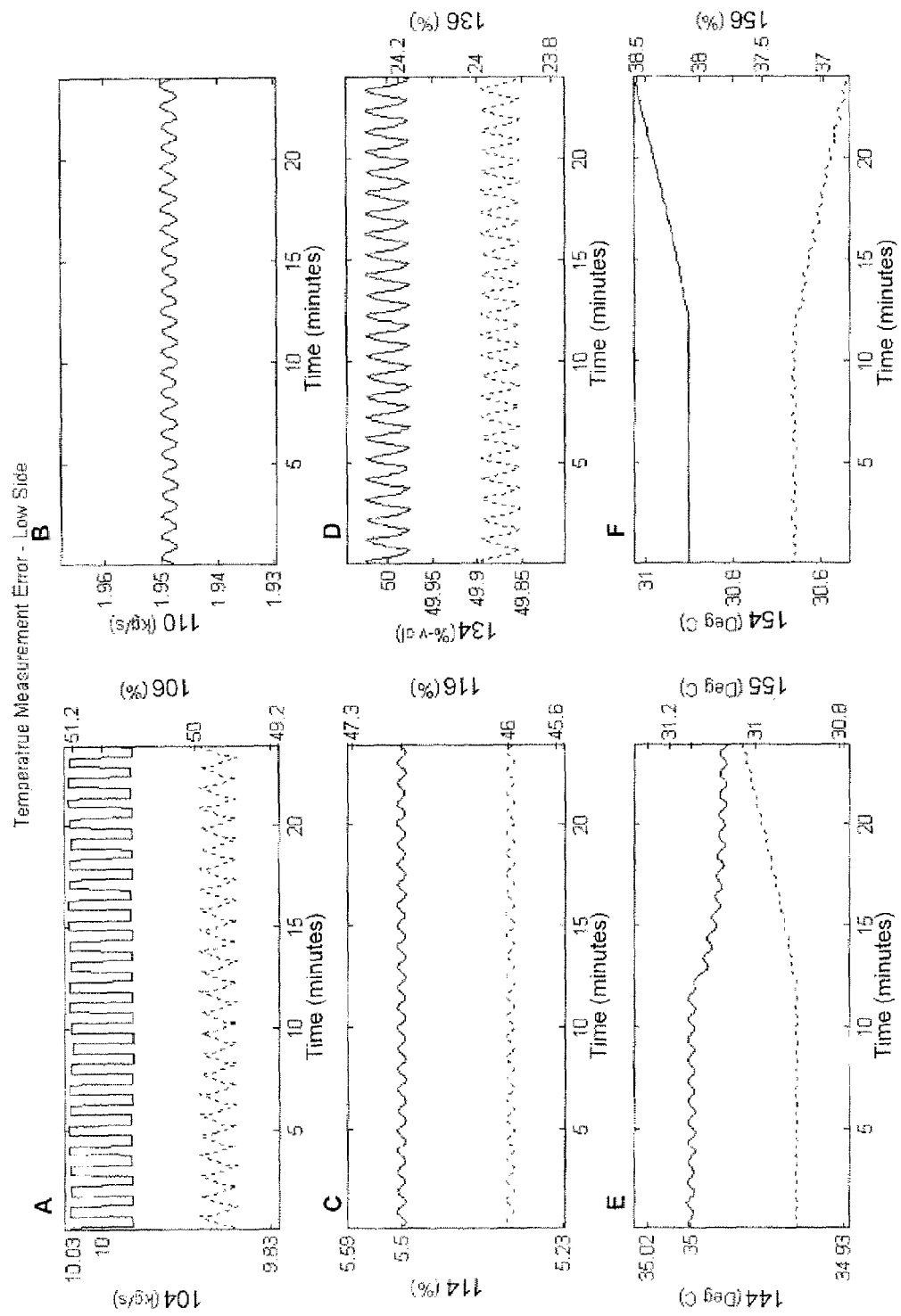
FIG. 9 is a depiction of a series of exemplary plots of raw process variable data versus time for a fourth fault case associated with the continuous reactor process of FIG. 5.
Figure 10:
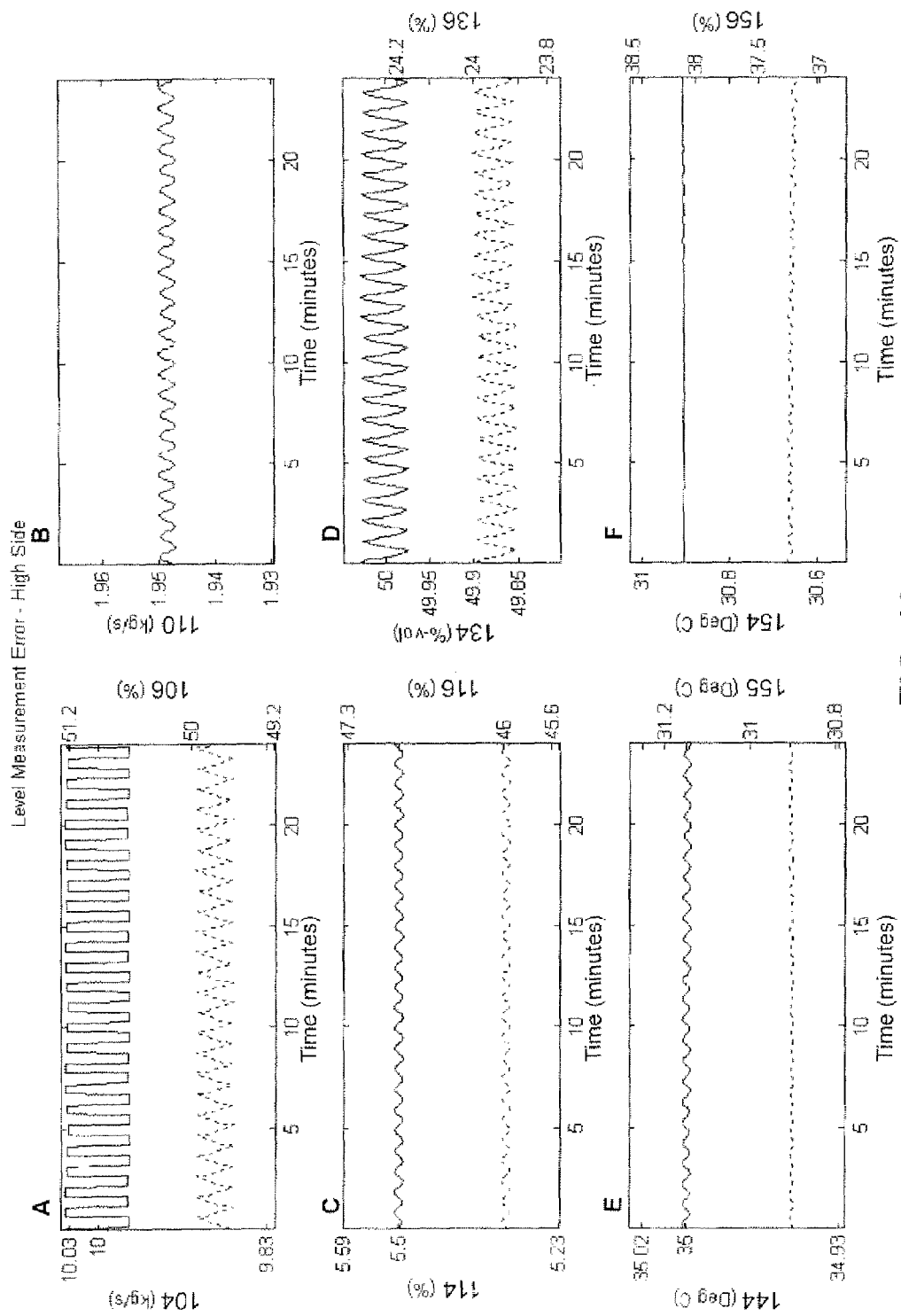
FIG. 10 is a depiction of a series of exemplary plots of raw process variable data versus time for a fifth fault case associated with the continuous reactor process of FIG. 5.
Figure 11:
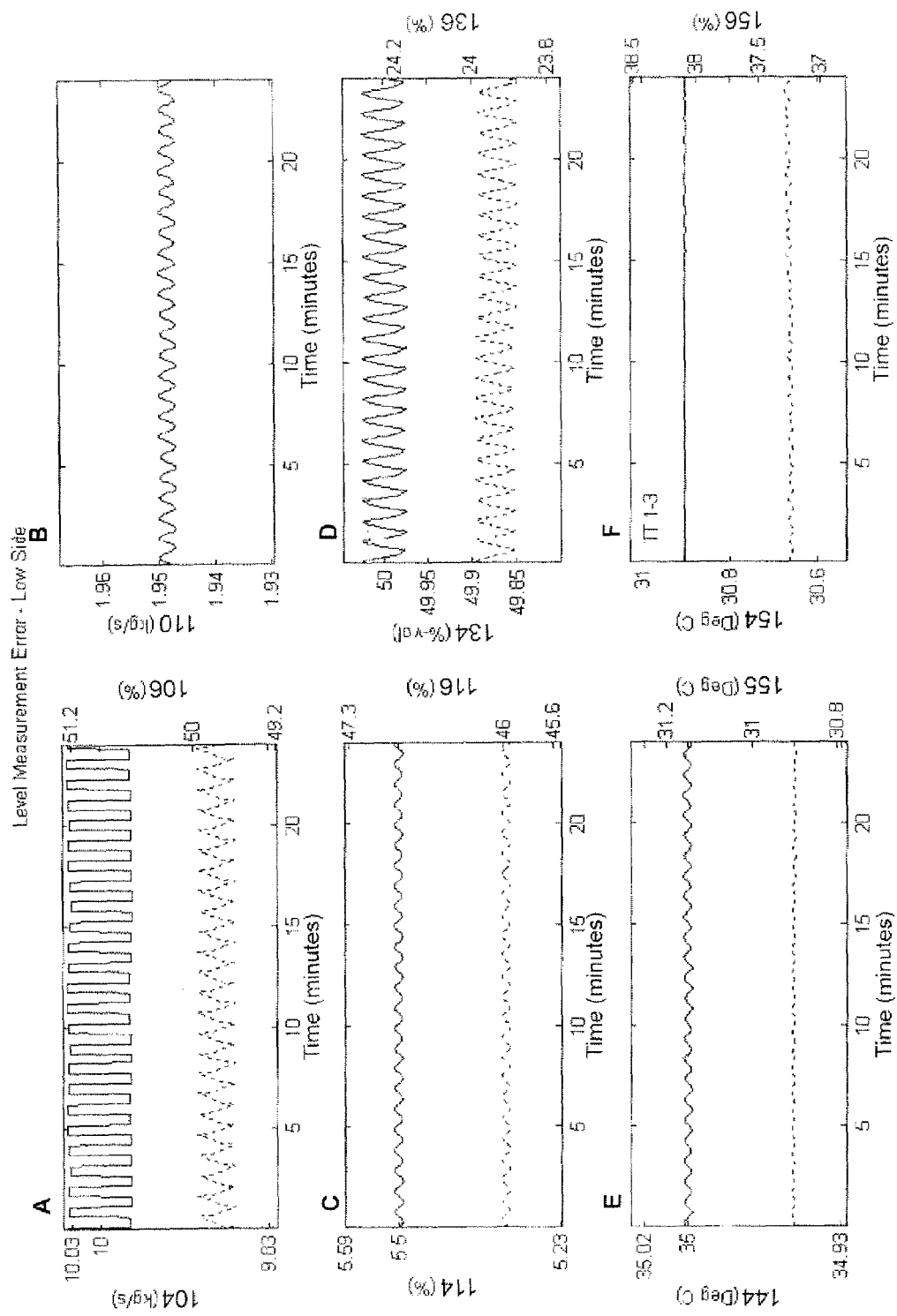
FIG. 11 is a depiction of a series of exemplary plots of raw process variable data versus time for a sixth fault case associated with the continuous reactor process of FIG. 5.
Figure 12:
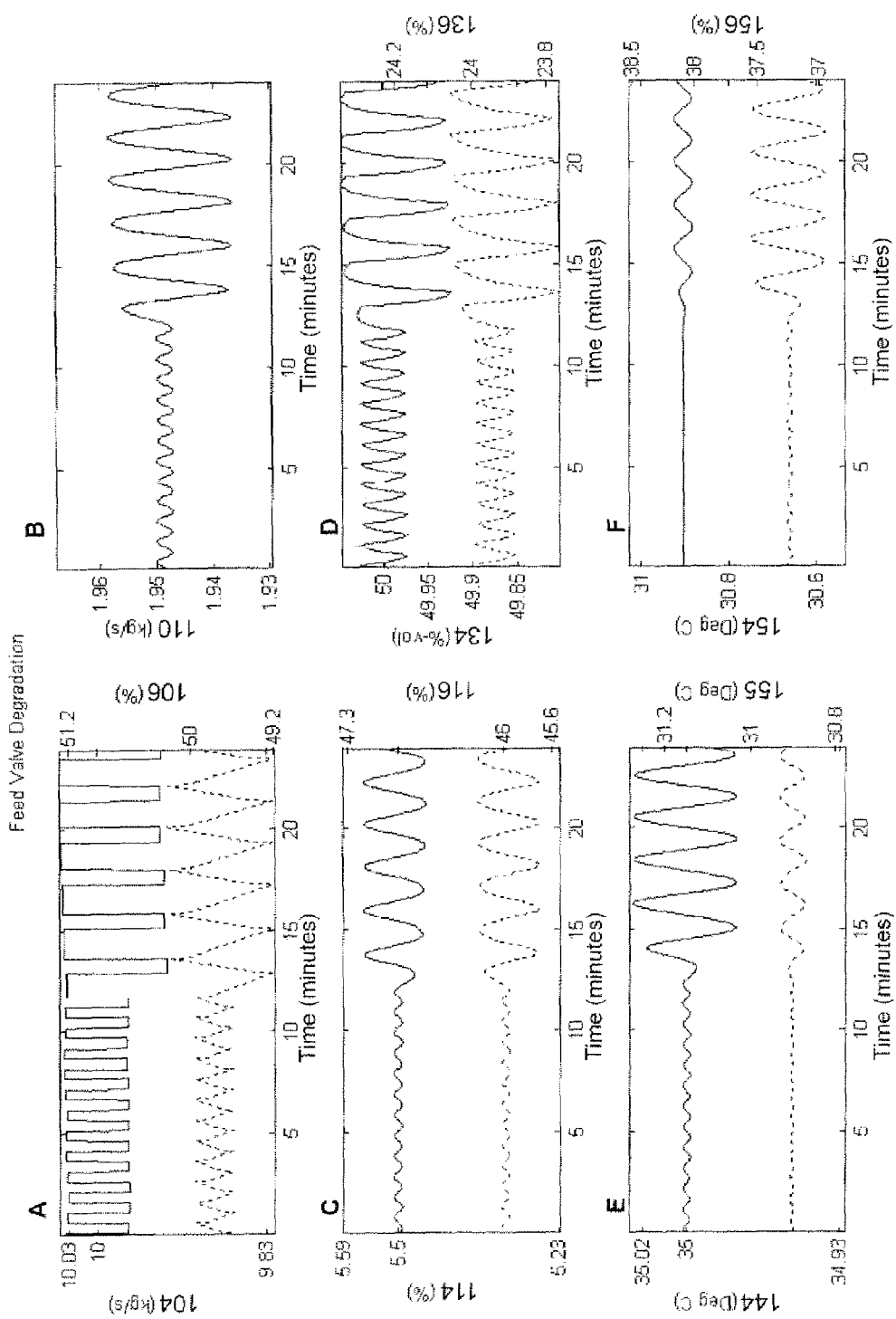
FIG. 12 is a depiction of a series of exemplary plots of raw process variable data versus time for a seventh fault case associated with the continuous reactor process of FIG. 5.

Likewise, FIGS. 7-12 each show plots of process variable data versus time collected from the process 100 of FIG. 5, for a different fault case. FIG. 7 shows process variable data for the cases of heat exchanger fouling. FIGS. 8 and 9 show process variable data for the case of temperature measurement error in the high and low directions, respectively. FIGS. 10 and 11 show process variable data for the case of level measurement error in the high and low directions, respectively. Lastly, FIG. 12 shows process variable data for the case of feed valve degradation.

Figure 13:
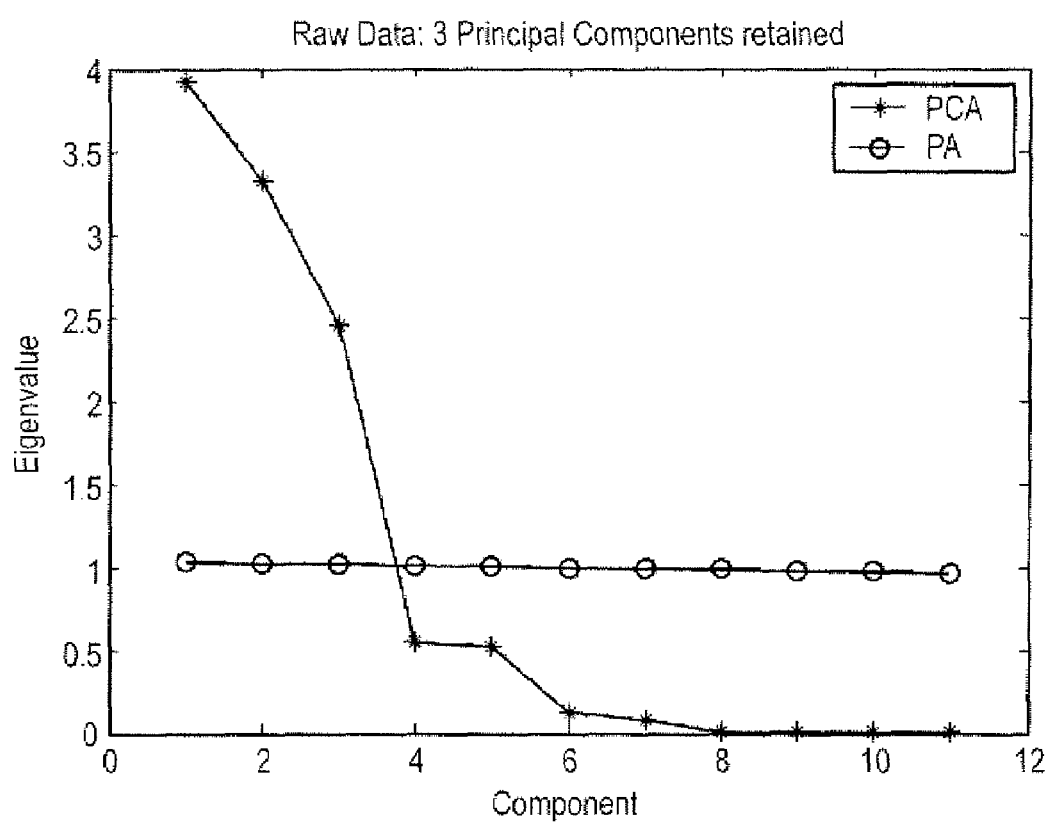
FIG. 13 is an exemplary plot illustrating the use of a parallel analysis to determine how many components to retain when using a principal component analysis on the raw process variable data of FIGS. 6-12.

FIG. 13 illustrates the application of Parallel Analysis to the raw control process variable data of FIGS. 6 through 12 to determine that the first three principal components contain the most significant variation and are therefore the most useful for analyzing future data based on PCA. The PCA model used to analyze future data therefore uses three loading vectors.

Figure 14:
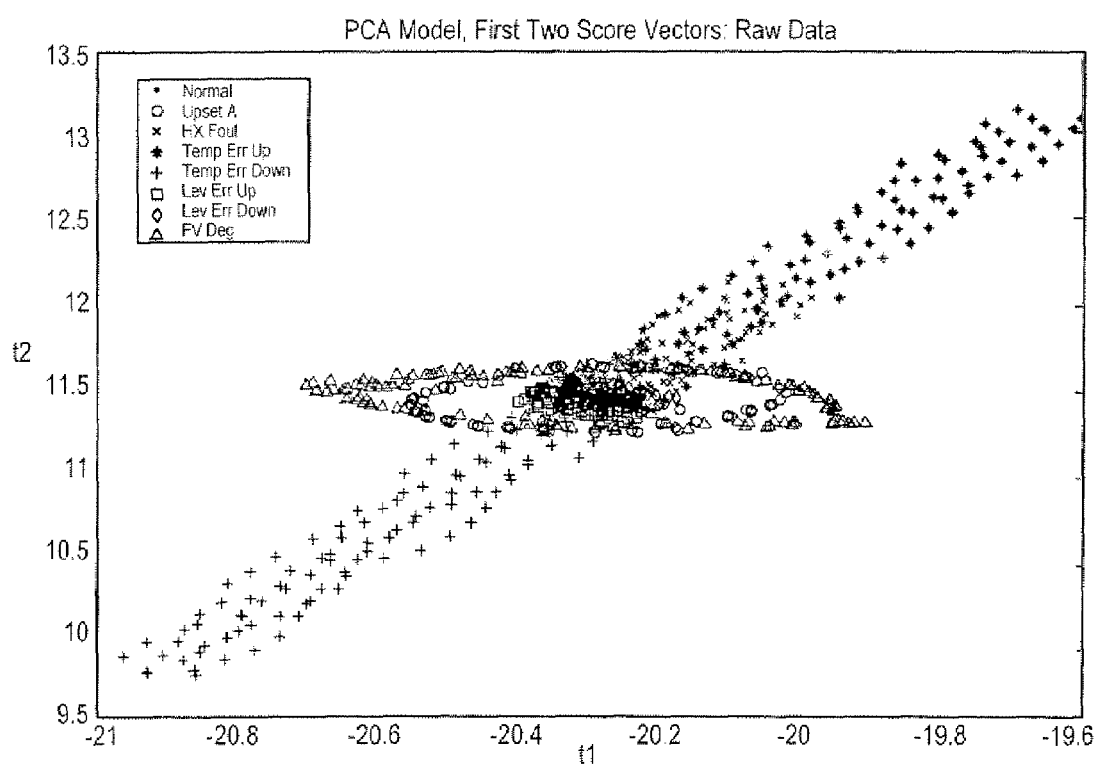
FIG. 14 is an exemplary depiction of the raw process variable data for all fault cases illustrated in FIGS. 6-12 plotted using the first two loading vectors determined by a principal component analysis.
Figure 15:
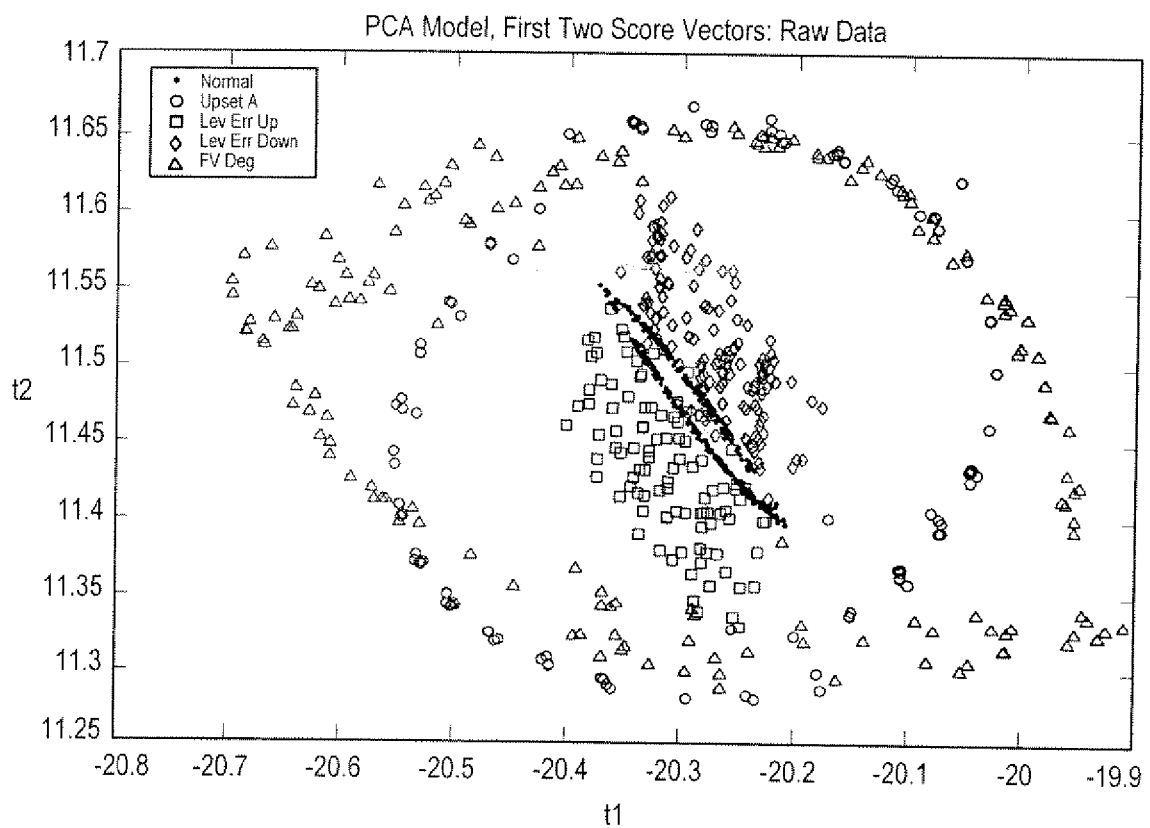
FIG. 15 is an exemplary depiction of the raw process variable data for four of the fault cases illustrated in FIGS. 6-12 plotted using the first two loading vectors determined by a principal component analysis.

Referring now to FIG. 14, raw process variable data for each of the eight process states (normal and each of seven fault conditions) can be plotted in the new subspace defined by the loading matrix and corresponding to the three retained principal components. Because it is difficult to visualize all three score vectors, FIG. 14 shows a plot of the raw process variable data against only the two largest principal components. FIG. 15 shows the same process variable data, except that only 4 of the fault conditions are shown, thereby giving better detail to these faults. As will be understood from the plots in these figures, it would be difficult to clearly delineate between one fault and another using an automated process, due to the degree of overlap between data associated with different fault cases. However, based on parallel analysis, 3 principal components were retained and two are plotted. Those of ordinary skill in the art will recognize that the third component, not easily visualized, may contain additional information that could help differentiate fault cases that appear to overlap.

Using the score discriminant function (eq. 6), a fault classification decision can be made for each of the raw process variable data. Table 3 shows a summary of how the raw process variable data of FIGS. 6 through 12 were classified by the PCA model. Though the raw process variable data analyzed herein is identical to that used as reference process variable data, it is understood that in the process control environment, a data set representing monitored process variable data would be distinct from a data set representing reference data.

TABLE 3

| Class | Total Count | Correct Count | % | Missed Alarms Count | % | False Alarms Count | % |
|---|---|---|---|---|---|---|---|
| Normal | 7969 | 7969 | 100.0 | N/A | N/A | 0 | 0.0 |
| Upset A | 2942 | 2759 | 93.8 | 17 | 0.6 | 166 | 5.6 |
| HX Foul | 1973 | 1160 | 58.8 | 128 | 6.5 | 685 | 34.7 |
| Temp Err Up | 1960 | 1596 | 81.4 | 4 | 0.2 | 360 | 18.4 |
| Temp Err Down | 1975 | 1803 | 91.3 | 4 | 0.2 | 168 | 8.5 |
| Lev Err Up | 1968 | 1558 | 79.2 | 410 | 20.8 | 0 | 0.0 |
| Lev Err Down | 2847 | 2379 | 83.6 | 468 | 16.4 | 0 | 0.0 |
| FV Deg | 3193 | 2781 | 87.1 | 22 | 0.7 | 390 | 12.2 |
| Total | 24827 | 22005 | 88.6 | 1053 | 4.2 | 1769 | 7.1 |

Table 3 shows that a fault classification system analyzing the raw process variable data of FIGS. 6 through 12 using the score discriminant function (eq. 6) would accurately classify 88.6% of the data points. However, due to the overlap between data associated with different fault cases, described above, certain fault classes (Lev Err Up and Lev Err Down) would have unusually high rates of missed alarms, while other fault classes (Heat Exchanger Fouling and Temp Err Up) would have unusually high rates of false alarms.

As indicated above, it is possible that the raw process variable data may contain data point outliers or otherwise erroneous data points within the set, which may indicate a false condition in the process, such as a missed alarm or a false alarm. In an FDI system, missed alarms may be considered more acceptable than false alarms, especially when the system is new. For example, missed alarms leave plant personnel no worse off than before the installation of the FDI system. However, false alarms cause plant personnel to spend time and resources chasing down problems that do not exist. After a few such alarms, plant personnel are likely to simply ignore the FDI system, or turn it off completely. Typically, missed alarms are not too much of a problem where the rate of occurrence is less than 10%. False alarm rates, however, particularly those as high as in the heat exchanger fouling and temperature error examples above, are generally too high for most fault detection systems.

PCA on Statistical Signature Data

As an alternative to using raw process variable data, one could analyze the same data set processing the PCA algorithm, but using statistical signature data based on the raw process variable data as reference data for the PCA calculations instead of the raw process variable data itself. Referring back to FIG. 3, the SPM blocks in the ADB 80 output statistical signature data to the controllers 12B and 14B, and ultimately to the FDI system 35. Alternatively, the PCA module 42 may calculate statistical signature data from raw process variable data communicated to the FDI system 35 and stored in the database 43 or 78, if the data is associated with known abnormal conditions. The PCA module 42 may then use statistical signature data as reference data for the PCA calculations.

As an example, the raw process variable data collected in the process 100 above, part of which is shown in FIGS. 6 through 12, could be output as statistical signature data from the ADBs of the field devices (104, 106, 108, etc.) of process 100. Mean and Standard Deviation are typical statistical signatures that may be used, though any number of other statistical signatures such as a median, a root-mean-square (RMS), a rate of change, a range, a minimum, a maximum, etc. could be used as well. The mean provides essentially the same measure as the raw data, but filters out most of the noise and reduces cyclic variation. The standard deviation provides a measure of the cyclic amplitude and background noise. When the field device calculates standard deviation, it often provides a measure of something that would otherwise be missing at the control system level. The field devices in the process 100 could be configured to have a sampling window size larger than the oscillation period of the measured process variables. Looking again at FIGS. 6 through 12, the oscillation of the sample process variable signals ranges from 50 to 85 seconds.

As an example of utilizing PCA on statistical signature data in a process instead of raw process variable data, analysis of the process 100 illustrated in FIG. 5 using statistical signature data did not use statistical signature data provided by SPM blocks. Instead, the system calculated statistical signature data from the raw process variable data collected in the simulation above. Using a sampling window of 120 seconds, the number of data points for each process variable decreased by a factor of 120, yielding only 206 total data points for this case.

Figure 16:
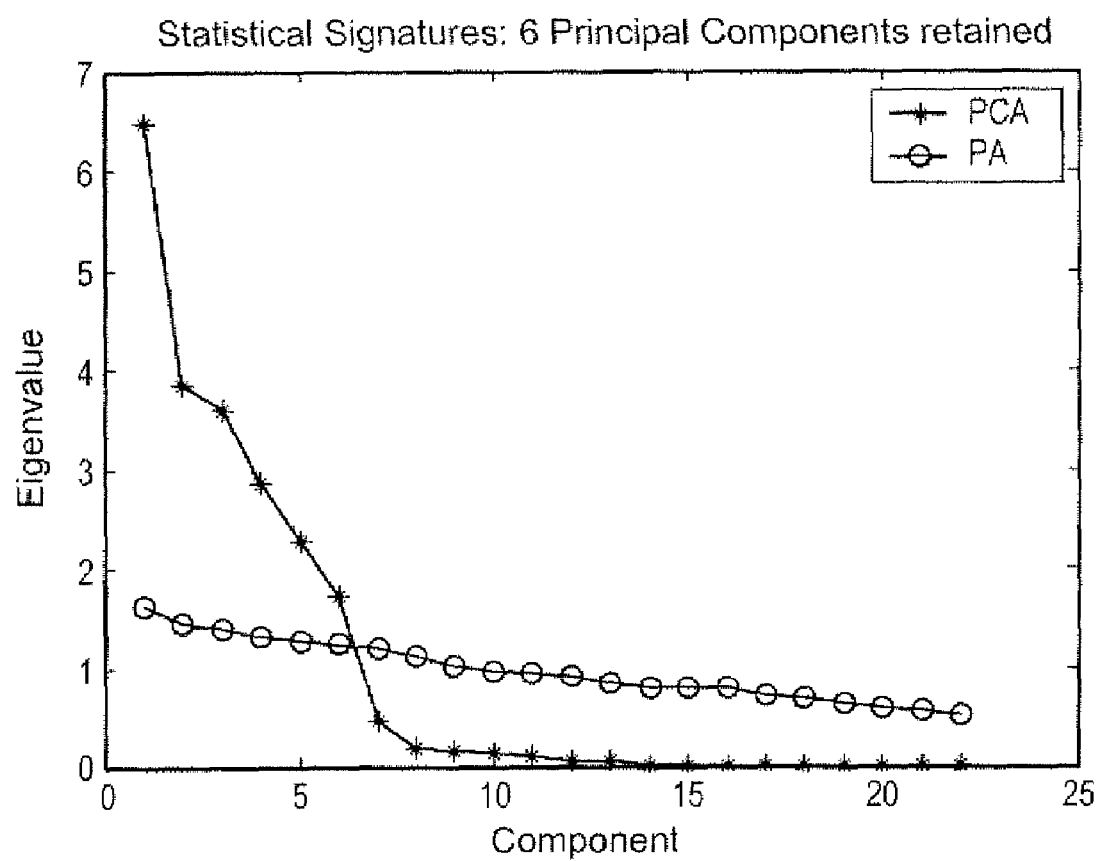
FIG. 16 is an exemplary plot illustrating the use of a parallel analysis to determine how many components to retain when using a principal component analysis on statistical signature data generated from the raw process variable data of FIGS. 6-12.
Figure 17:
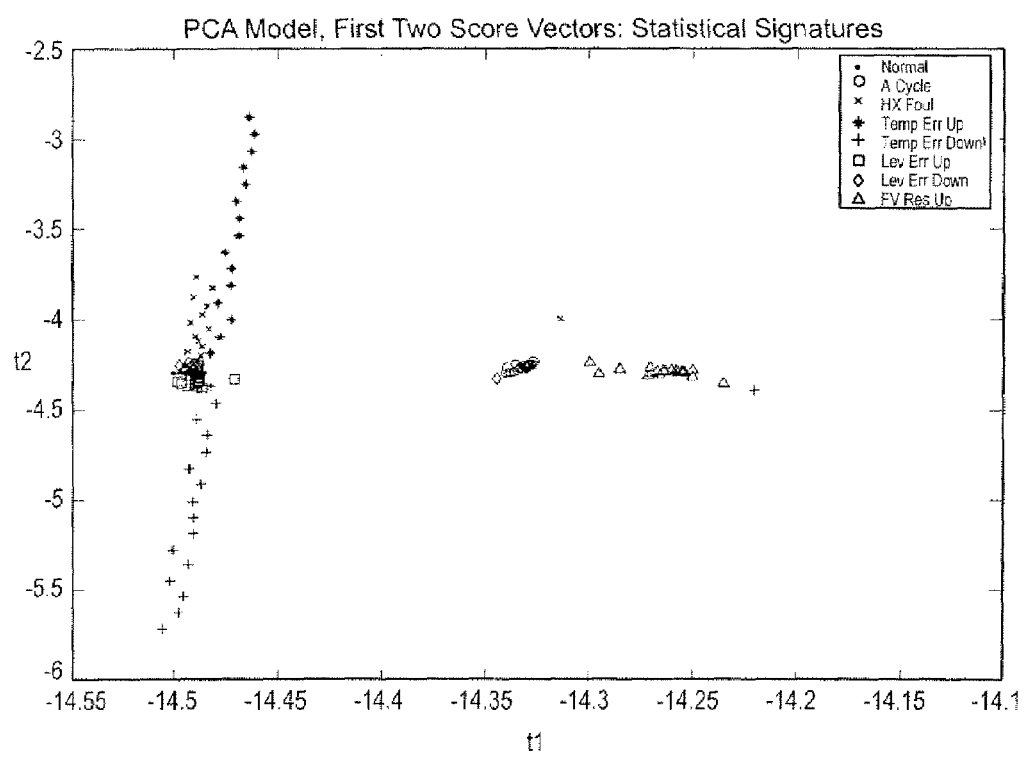
FIG. 17 is an exemplary depiction of statistical signature data generated for all fault cases from the raw process variable data of FIGS. 6-12 plotted using the first two loading vectors determined by a principal component analysis.
Figure 18:
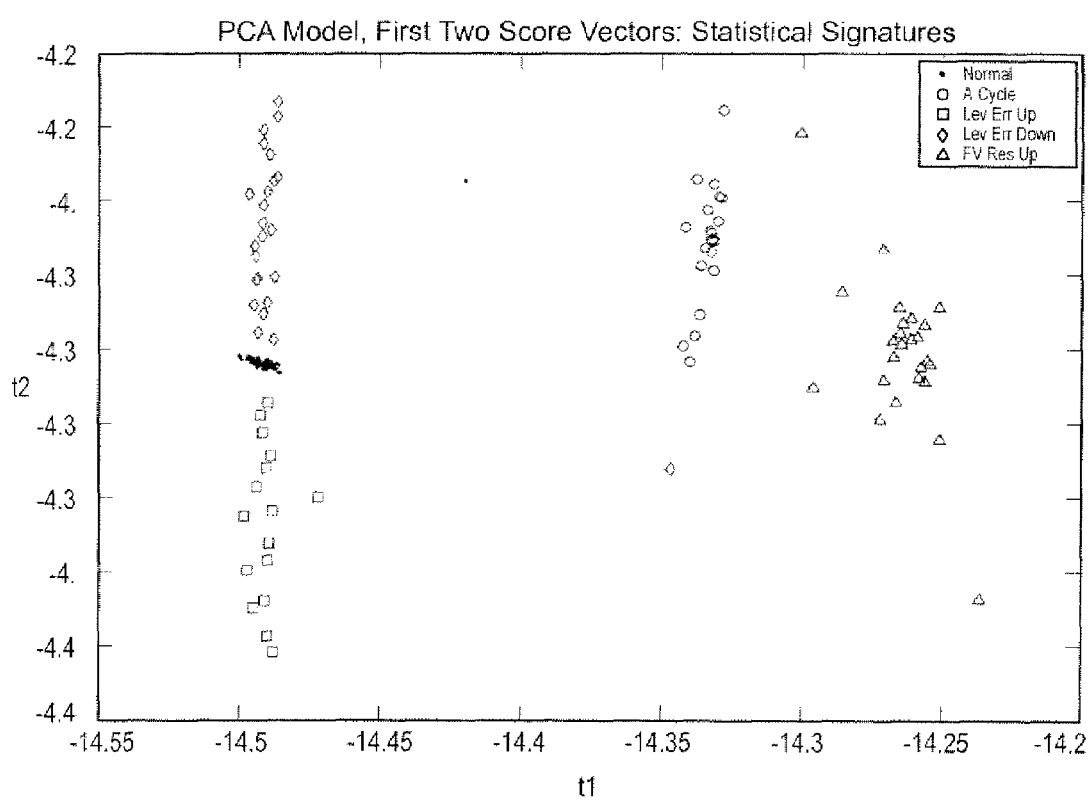
FIG. 18 is an exemplary depiction of statistical signature data generated for four of the fault cases from the raw process variable data of FIGS. 6-12 plotted using the first two loading vectors determined by a principal component analysis.

FIG. 16 shows that PCA on the statistical signature data set, using parallel analysis to select the number of loading vectors, determines that six principal components should be retained. Just as with the raw process variable data, it may be difficult to visualize all of the score vectors from the analysis. However, a plot of the statistical signature data projected on the first two score vectors is shown in FIG. 17, which shows a separation between all eight of the classes (seven fault classes and one normal class). FIG. 18 is a plot of the same case, but shows only four of the selected faults, in order to more clearly see the separation between the classes.

Table 4, below, shows a summary of the results when the score discriminant classification method (eq. 6) is applied to each of the samples:

TABLE 4

| Class | Total Count | Correct Count | Correct % | Missed Alarms Count | Missed Alarms % | False Alarms Count | False Alarms % |
|---|---|---|---|---|---|---|---|
| Normal | 67 | 67 | 100.0 | N/A | N/A | 0 | 0.0 |
| Upset A | 24 | 24 | 100.0 | 0 | 0.0 | 0 | 0.0 |
| HX Foul | 17 | 17 | 100.0 | 0 | 0.0 | 0 | 0.0 |
| Temp Err Up | 16 | 15 | 93.8 | 0 | 0.0 | 1 | 6.3 |
| Temp Err Down | 17 | 17 | 100.0 | 0 | 0.0 | 0 | 0.0 |
| Lev Err Up | 16 | 15 | 93.8 | 0 | 0.0 | 1 | 6.3 |
| Lev Err Down | 24 | 224 | 100 | 0 | 0.0 | 0 | 0.0 |
| FV Deg | 25 | 25 | 100.0 | 0 | 0.0 | 0 | 0.0 |
| Total | 206 | 204 | 99.0 | 0 | 0.0 | 2 | 1.0 |

Table 4 shows a significant improvement in the classification resulting from the analysis using statistical signature data. There were no missed alarms for any of the fault cases, and only two false alarms. Overall, the correct classification would be made for 99% of the samples in this case, as opposed to 88.6% of the samples in the case using the raw sample process variable data.

The relative improvement achieved by using statistical signature data as reference data for PCA instead of raw process variable data can be understood by referring again to FIGS. 6 through 12. For some of the fault cases, the trend of many of the sample process variables is in a single direction. Because PCA is a linear transformation, a movement of a single process variable in a single linear direction is still linear when translated into a new subspace. However, in other of the fault cases, one or more of the process variables changes in that it oscillates with larger or smaller amplitude. When a linear transformation such as PCA is applied to an oscillating signal, the result is the scores from some of the faults plotting in a circle, as seen in the faults of Reactant A Upset and Feed Valve Degradation in FIG. 18. Because standard deviation captures the oscillation of the process variables, a change in the amplitude of oscillation is directly reflected in the value of the standard deviation. Thus, the standard deviation moves in a single linear direction, and a change in standard deviation can be seen in the linear transformation of PCA.

While the FDI system 35 and other process elements have been described as preferably being implemented in software, they may be implemented in hardware, firmware, etc., and may be implemented by any other processor associated with the process control system 10. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, wireless communication, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A multivariate statistical analysis system comprising:
a processor;
a memory coupled to the processor; and
a first set of machine-readable instructions for execution by the processor, stored in the memory, and comprising a first analysis tool that, when executed:
receives a first set of statistical measures indicative of the operation of a process in a process plant, each statistical measure comprising the result of a statistical calculation performed on two or more measured values of a particular parameter of the process;
performs a multivariate statistical analysis on the first set of statistical measures; and
outputs a representation of the operation of the process based on the first set of statistical measures.

2. The system of claim 1, wherein the received first set of statistical measures is representative of the operation of the process in a known state.

3. The system of claim 1, wherein the first statistical measures are calculated within a device being monitored within the plant.

4. The system of claim 1, wherein the first analysis tool is adapted to generate the first statistical measures indicative of the operation of the process from first data collected by a data collection module, wherein the data are related to a plurality of devices within the process plant.

5. The system of claim 1, wherein the multivariate statistical analysis comprises a principal component analysis.

6. The system of claim 1, further comprising a second analysis tool that, when executed:
receives a second set of statistical measures indicative of the operation of a process;
receives the representation of the operation of the process based on the first set of statistical measures; and
represents the operation of the process in an unknown state based on the second set of statistical measures,
wherein the second set of statistical measures is representative of the operation of the process in an unknown state.

7. The system of claim 6, further comprising an execution engine adapted to implement the first and second analysis tools resulting in a multivariate statistical representation of the operation of the process in a known state and from which the operation of the process in an unknown state may be determined.

8. The system of claim 6, wherein the second analysis tool is adapted to determine the presence of an abnormal process condition.

9. The system of claim 8, further wherein the second analysis tool generates an alarm based on the presence of the abnormal process condition.

10. The system of claim 8, wherein the second analysis tool is adapted to identify the abnormal process condition.

11. The system of claim 10, further wherein the second analysis tool is adapted to generate an alarm corresponding to the identified abnormal process condition.

12. The system of claim 6, wherein the second analysis tool is adapted to predict an occurrence of an abnormal process condition.

13. The system of claim 12, further wherein the second analysis tool is adapted to generate an alarm based on the predicted occurrence of the abnormal process condition.

14. The system of claim 12, wherein the second analysis tool is adapted to identify the abnormal process condition of the predicted occurrence of the abnormal process condition.

15. The system of claim 14, wherein the second analysis tool adapted to generate an alarm corresponding to the identified abnormal process condition.

16. The system of claim 1, wherein each statistical measure of the first set of statistical measures comprises one of the group consisting of: a mean, a mean change, a median, a median change, a standard deviation, a standard deviation change, a variance, a skewness, a kurtosis, a root-mean-square (RMS), a rate of change, a range, a minimum, and a maximum.

17. A method for monitoring a process in a process plant, the method comprising:
    collecting data representative of an operation of the process;
    calculating a statistical measure on the collected data representative of the operation of the process in a known state, wherein the statistical measure is the result of a statistical calculation on two or more measured values of a particular parameter of the process; and
    performing a multivariate statistical analysis to represent the operation of the process in a known state based on a set of collected reference data comprising the statistical measure of the operation of the process in the known state.

18. The method of claim 17, wherein calculating a statistical measure on the collected data representative of the operation of the process comprises performing a statistical calculation on the collected data representative of the operation of the process to generate the statistical measure of the operation of the process in the known state.

19. The method of claim 17, further comprising calculating a statistical measure on the collected data representative of the operation of the process in an unknown state.

20. The method of claim 17, wherein the multivariate statistical analysis comprises a principal component analysis.

21. The method of claim 17, wherein the collected data comprises raw data associated with a plurality of devices within the process plant, and wherein calculating a statistical measure on the collected data representative of the operation of the process comprises calculating a statistical measure on the raw data.

22. The method of claim 17, wherein the collected data is representative of an operation of a device within the process, and wherein calculating a statistical measure on the collected data representative of the operation of the process comprises calculating a statistical measure within the device.

23. The method of claim 17, wherein the representation of the operation of the process in a known state comprises a representation of the operation of the process in one or more known abnormal conditions.

24. The method of claim 17 further comprising representing the operation of the process in an unknown state based a set of monitored data comprising a statistical measure of the operation of the process in the unknown state and using the output of the multivariate statistical analysis as an input.

25. The method of claim 24 further comprising comparing the process in the unknown state to the multivariate statistical representation of the operation of the process in the known state to determine the operational state of the process.

26. The method of claim 24, further comprising:
    comparing the representation of the process in an unknown state to the representation of the process in a known state; and
    detecting the presence of an abnormal process condition from the comparison.

27. The method of claim 26, further comprising generating an alarm based on the detection of an abnormal process condition.

28. The method of claim 26, further comprising identifying the abnormal process condition.

29. The method of claim 28, further comprising generating an alarm corresponding to an identified abnormal process condition.

30. The method of claim 26, further comprising predicting the occurrence of an abnormal process condition.

31. The method of claim 30, further comprising generating an alarm based on the predicted occurrence of an abnormal process condition.

32. The method of claim 30, further comprising identifying the abnormal process condition of the predicted occurrence of an abnormal process condition.

33. The method of claim 32, further comprising generating an alarm corresponding to an identified abnormal process condition.

34. The method of claim 17, wherein the statistical measure comprises one of the group consisting of: a mean, a mean change, a median, a median change, a standard deviation, a standard deviation change, a variance, a skewness, a kurtosis, a root-mean-square (RMS), a rate of change, a range, a minimum, and a maximum.

35. A system for monitoring a process in a process plant, the system comprising:
    a first analysis tool for:
        receiving a first set of statistical measures, each of the first set of statistical measures being the result of a statistical calculation on two or more measured values of a particular parameter of the process, each of the first set of the statistical measures indicative of the operation of the process while the process is in one or more known conditions; and
        performing a multivariate statistical analysis on the first set of statistical measures to generate a multivariate statistical representation of the operation of the process in the one or more known conditions; and
    a second analysis tool for:
        receiving a second set of statistical measures, each of the second set of statistical measures being the result of a statistical calculation on two or more measured values of the particular parameter of the process, each of the second set of statistical measures indicative of the operation of the process while the process is in an unknown condition;

receiving the multivariate statistical representation of the operation of the process;

projecting the received second set of statistical measures onto the multivariate statistical representation of the operation of the process to represent the operation of the process in the unknown condition; and determining the unknown condition based on the observation of the second set of statistical measures projected onto the multivariate statistical representation as compared with the observation of the first set of statistical measures projected onto the multivariate statistical representation.

36. The system of claim 35, wherein the first analysis tool is adapted to execute a principal component analysis to generate the multivariate statistical representation.

37. The system of claim 35, wherein the first analysis tool is adapted to assign an observation of the first set of statistical measures projected onto the multivariate statistical representation to an abnormal condition.

38. The system of claim 37, wherein the first analysis tool is adapted to assign an observation of the first set of statistical measures projected onto the multivariate statistical representation to an abnormal condition according to a score discriminant.

39. A system for monitoring a process in a process plant, the system comprising:

a first analysis tool for:
receiving a first set of statistical measures, each of the first set of statistical measures being the result of a statistical calculation on two or more measured values of a particular parameter of the process, each of the first set of the statistical measures indicative of the operation of the process while the process is in one or more known conditions; and performing a multivariate statistical analysis on the first set of statistical measures to generate a multivariate statistical representation of the operation of the process in the one or more known conditions; and a second analysis tool for:
receiving a second set of statistical measures, each of the second set of statistical measures being the result of a statistical calculation on two or more measured values of the particular parameter of the process, each of the second set of statistical measures indicative of the operation of the process while the process is in an unknown condition;

receiving the multivariate statistical representation of the operation of the process;

projecting the received second set of statistical measures onto the multivariate statistical representation of the operation of the process to represent the operation of the process in the unknown condition; and determining the unknown condition based on the observation of the second set of statistical measures projected onto the multivariate statistical representation as compared with the observation of the first set of statistical measures projected onto the multivariate statistical representation;

wherein the first analysis tool is adapted to assign an observation of the first set of statistical measures projected onto the multivariate statistical representation to an abnormal condition according to a score discriminant; and further wherein the score discriminant comprises a maximum score discriminant calculated as:

$$g_i(x) = -\frac{1}{2}(x - \bar{x}_i)^T P(P^T S_i P)^{-1} P^T (x - \bar{x}_i) + \ln(p_i) - \frac{1}{2}\ln[\det(P^T S_i P)]$$

x = vector of original process variable measurements
$g_i$ = likelihood that x belongs to abnormal condition class i
$\bar{x}_i$ = a mean vector of all observations belonging to class i
P = a principal component analysis loading matrix
$S_i$ = a covariance matrix of all observations belonging to class i
$p_i$ = a priori probability of an observation belonging to class i.

40. The system of claim 39, wherein the second analysis tool is adapted to associate the observation of the first set of statistical measures to an abnormal condition based upon a maximum value of $g_i$.

41. A system for monitoring a process in a process plant, the system comprising:

a first analysis tool for:
receiving a first set of statistical measures, each of the first set of statistical measures being the result of a statistical calculation on two or more measured values of a particular parameter of the process, each of the first set of the statistical measures indicative of the operation of the process while the process is in one or more known conditions; and performing a multivariate statistical analysis on the first set of statistical measures to generate a multivariate statistical representation of the operation of the process in the one or more known conditions; and a second analysis tool for:
receiving a second set of statistical measures, each of the second set of statistical measures being the result of a statistical calculation on two or more measured values of the particular parameter of the process, each of the second set of statistical measures indicative of the operation of the process while the process is in an unknown condition;

receiving the multivariate statistical representation of the operation of the process;

projecting the received second set of statistical measures onto the multivariate statistical representation of the operation of the process to represent the operation of the process in the unknown condition; and determining the unknown condition based on the observation of the second set of statistical measures projected onto the multivariate statistical representation as compared with the observation of the first set of statistical measures projected onto the multivariate statistical representation;

wherein the first analysis tool is adapted to assign an observation of the first set of statistical measures projected onto the multivariate statistical representation to an abnormal condition according to a score discriminant; and further wherein the score discriminant is calculated as:

$$g_i(x) = (x - \bar{x}_i)^T P(P^T S_i P)^{-1} P^T (x - \bar{x}_i) + \ln[\det(P^T S_i P)]$$

wherein:
x = vector of original process variable measurements likelihood that x belongs to abnormal condition class i
$g_i$ = a mean vector of all observations belonging to class i $\bar{x}_i$=a mean vector of all observations belonging to class i
P=a principal component analysis loading matrix
$S_i$=a covariance matrix of all observations belonging to class i.

42. The system of claim 41, wherein the second analysis tool is adapted to associate the observation of the first set of statistical measures to an abnormal condition based upon a minimum value of $g_i$.

43. The system of claim 35, wherein the second analysis tool is adapted to detect an abnormal condition based on the determination of the unknown condition.

44. The system of claim 43, wherein the second analysis tool is adapted to identify the abnormal condition based on the observation of the second set of statistical measures projected onto the multivariate statistical representation as compared with the observation of the first set of statistical measures projected onto the multivariate statistical representation, wherein the known condition comprises a known abnormal condition.

45. The system of claim 43, wherein the second analysis tool is adapted to generate an alarm based on the detected abnormal condition.

46. The system of claim 43, wherein the detected abnormal condition comprises a predicted occurrence of the abnormal condition.

47. The system of claim 43, wherein the detected abnormal condition comprises an actual occurrence of the abnormal condition.

48. The system of claim 35, wherein the second set of statistical measures comprises one of the group consisting of: a mean, a mean change, a median, a median change, a standard deviation, a standard deviation change, a variance, a skewness, a kurtosis, a root-mean-square (RMS), a rate of change, a range, a minimum, and a maximum.

49. The system of claim 35, wherein the first set of statistical measures comprises one of the group consisting of: a mean, a mean change, a median, a median change, a standard deviation, a standard deviation change, a variance, a skewness, a kurtosis, a root-mean-square (RMS), a rate of change, a range, a minimum, and a maximum.

* * * * *